US011878774B2

(12) United States Patent
Eikens et al.

(10) Patent No.: US 11,878,774 B2
(45) Date of Patent: Jan. 23, 2024

(54) TIE-IN SYSTEM AND FLUID TRANSFER SYSTEM COMPRISING SUCH A TIE-IN SYSTEM

(71) Applicant: ECONNECT ENERGY AS, Oslo (NO)

(72) Inventors: Magnus Eikens, Oslo (NO); John Randolph Holland, Schwanewede (DE); Stian Tunestveit Magnusson, Oslo (NO); Bjornar Danielsen, Asker (NO)

(73) Assignee: ECONNECT ENERGY AS, Oslo (NO)

( * ) Notice: Subject to any disclaimer, the term of this patent is extended or adjusted under 35 U.S.C. 154(b) by 327 days.

(21) Appl. No.: 16/640,371

(22) PCT Filed: Sep. 6, 2018

(86) PCT No.: PCT/EP2018/074008
§ 371 (c)(1),
(2) Date: Feb. 20, 2020

(87) PCT Pub. No.: WO2019/048546
PCT Pub. Date: Mar. 14, 2019

(65) Prior Publication Data

US 2020/0262522 A1 Aug. 20, 2020

(30) Foreign Application Priority Data

Sep. 6, 2017 (NO) .................................... 20171442

(51) Int. Cl.
*B63B 27/32* (2006.01)
*B63B 27/25* (2006.01)
(Continued)

(52) U.S. Cl.
CPC .............. *B63B 27/25* (2013.01); *B63B 27/32* (2013.01); *B63B 27/34* (2013.01); *B67D 9/00* (2013.01);
(Continued)

(58) Field of Classification Search
CPC ........... B67D 9/00; B63B 27/24; B63B 27/25; B63B 27/32; B63B 27/34
See application file for complete search history.

(56) References Cited

U.S. PATENT DOCUMENTS 2,922,446 A 1/1960 Sheiry
3,199,553 A * 8/1965 Garrett .................... B63B 27/18 285/317
3,910,609 A * 10/1975 Van der Gaag ....... B63B 22/021 441/3
4,231,398 A * 11/1980 Gibbons ............. F16L 37/1205 285/24
(Continued)

FOREIGN PATENT DOCUMENTS

CN 1384792 12/2002
CN 1420841 5/2003
(Continued)

OTHER PUBLICATIONS

Examination report from Australia IP Office, cited inter alia as statement of relevance for non-English reference cited therein.
CN Search report dated Jun. 9, 2021 (in particular relevance codes indicated for each reference).

*Primary Examiner* — Jason K Niesz
(74) *Attorney, Agent, or Firm* — Robinson & Cole LLP

(57) ABSTRACT

A tie-in system (47, 48) for tie-in of a transfer pipe (13, 14) to a support unit (12) is disclosed, where the transfer pipe (13, 14) is arranged at least partly in a body of water (19). The tie-in system (47, 48) comprises: a spool piece (61, 71) that in one end is adapted to be attached to the transfer pipe (13, 14) and in the other end to be connected to a pipe
(Continued)

element (58, 68) arranged on the support unit (12), a chute device (59, 69) that is adapted to be attached to the support unit (12) and to accommodate the transfer pipe (13, 14) such that the chute device (59, 69) supports the transfer pipe (13, 14) and takes up and transfers vertical and transverse forces from the transfer pipe (13, 14) to the support unit (12), a tie-in device (77, 79) that is connected to the spool piece (61, 71) and is adapted to be connected to a tie-in member (76, 78) on the support unit (12) such that tension loads are transferred from the transfer pipe (13, 14) to the support unit (12). A fluid transfer system (10) comprising such a tie-in system (47, 48) is also disclosed.

30 Claims, 10 Drawing Sheets

(51) Int. Cl.

| | |
|---|---|
| ***B63B 27/34*** | (2006.01) |
| ***F17C 9/00*** | (2006.01) |
| ***B67D 9/00*** | (2010.01) |
| *B63B 22/02* | (2006.01) |

(52) U.S. Cl.

CPC .............. *F17C 9/00* (2013.01); *B63B 22/021* (2013.01); *F17C 2205/0323* (2013.01); *F17C 2223/0161* (2013.01); *F17C 2270/0118* (2013.01)

(56) References Cited

U.S. PATENT DOCUMENTS

| | | | | |
|---|---|---|---|---|
| 5,261,773 | A * | 11/1993 | Thomas | B63B 27/24 414/141.8 |
| 6,637,479 | B1 * | 10/2003 | Eide | B63B 27/24 114/230.1 |
| 2003/0143034 | A1 | 7/2003 | Kelm et al. | |
| 2009/0266087 | A1 | 10/2009 | Adkins et al. | |
| 2009/0272459 | A1 | 11/2009 | France | |
| 2013/0153083 | A1 | 6/2013 | Liu | |
| 2016/0137273 | A1 * | 5/2016 | Syvertsen | B63B 27/25 114/271 |

FOREIGN PATENT DOCUMENTS

| | | | |
|---|---|---|---|
| CN | 101061344 | 10/2007 | |
| CN | 102548839 | 7/2012 | |
| CN | 204021209 | 12/2014 | |
| CN | 105745149 | 7/2016 | |
| GB | 1586835 | 3/1981 | |
| JP | S62123000 | 6/1987 | |
| WO | WO2007032842 A2 | 3/2007 | |
| WO | 2014/122159 | 8/2014 | |
| WO | WO-2014122122 A1 * | 8/2014 | B63B 27/24 |
| WO | 2016/052374 | 9/2014 | |

* cited by examiner

TIE-IN SYSTEM AND FLUID TRANSFER SYSTEM COMPRISING SUCH A TIE-IN SYSTEM

CROSS REFERENCE TO RELATED APPLICATIONS

The instant application is a U.S. National Stage application of and claims priority to PCT/EP2018/074008, filed on Sep. 6, 2018, which is a PCT application of and claims priority to NO Application No. 20171442, filed on Sep. 6, 2017, the subject matter of both aforementioned applications are hereby incorporated by reference in their entireties.

The present invention relates generally to a support system for floating and/or submerged flexible pipes and hoses or aerial hoses that are connected to a process system on a marine installation such as ships, offshore or onshore support units and marine terminals where the process system comprises at least one pipe. More specifically, the present invention is related to a tie-in system for tie-in of a transfer pipe to a support unit and a fluid transfer system for transfer of a fluid between a floating facility and a receiving structure.

For floating units it is now common practice to load or discharge fluids such as liquids, liquefied gases and fluidized amorphous solids via flexible pipes, hoses or subsea risers between ships, offshore units and/or onshore terminals. Normally the floating flexible pipe, hose or riser is lifted from the sea and connected to a fixed manifold or pipe on the floating unit to enable transfer of fluid. When the transfer operation is completed the floating flexible pipe, hose or riser is disconnected from the manifold or pipe of the floating unit and returned to the sea. Transfer using aerial hoses is carried out in a similar manner. The difficulty of handling and lifting the flexible pipe, hose or riser up to the fixed manifold or pipe on the floating unit is proportional to the forces and moments acting on the flexible pipe, hose or riser.

It is usual for the floating flexible pipe, hose or riser to be relatively short and the transfer operation must be conducted in acceptable environmental conditions for example low sea state, low current and no drift ice.

There is a growing need for such transfer operations to be carried out over longer distances and in more severe environmental conditions. The floating flexible pipes, hoses or risers may need to remain connected to their manifolds or pipes for an extended period of time. The fixed manifolds or pipes on ships, offshore units and marine terminals are designed to handle forces and bending moments which may be encountered during transfer operations employing conventional transfer methods, for example loading arms, aerial hoses and short flexible pipes, hoses or risers.

The forces and bending moments of longer floating flexible pipes, hoses or risers which are subject to relatively high sea states, currents, winds or ice will greatly exceed that of current manifold or pipe end design standards. Strengthening the manifold or pipe to accommodate such forces is costly as well as technically and operationally challenging and requires unwanted modification.

Hence, an objective of the present invention to develop a system for transfer of a fluid across a body of water that alleviates the problems caused by forces and bending moments on longer pipes or hoses in water caused by high sea states, water currents, winds, ice conditions etc.

It has further been an objective of the present invention to develop system that ties in a fluid pipe or a hose transferring fluid across a body of water so that the system is capable of handling forces and bending moments on the fluid pipe or hose caused by high sea states, currents, winds, ice conditions etc.

It has also been an objective of the present invention to develop a process system comprising one or more pipes on a support unit for transfer of fluid to or from a fluid pipe or hose arranged in a body of water.

It has further been an objective of the present invention to develop a process system comprising one or more pipes that can be arranged on a support unit such that draining and purging can be enabled without the presence of a floating or non-floating unit.

It has further been an objective of the present invention to develop a process system comprising one or more pipes that can be arranged on a support unit, and that helps to alleviate the problems caused by forces and bending moments on longer pipes or hoses in water due to high sea states, currents, winds, ice conditions etc.

It has further been objective of the present invention to develop a system for transfer of a fluid across a body of water that provides a simpler, cheaper and more versatile transfer solution of the fluid.

These objectives are achieved with a tie-in system as defined in claim 1 and a fluid transfer system as defined in claim 8. Further embodiments of the tie-in system and the fluid transfer system are defined in dependent claims 2-7 and dependent claims 9-19 respectively.

The present invention involves a tie-in system and a process system arranged on a support unit for transfer of a fluid through a transfer pipe via a support unit, for example transfer of a cryogenic liquid like LNG between two floating facilities or between a floating facility like an LNG-carrier and a receiving structure comprising storage facilities, preferably located onshore, but may also be located partly or completely offshore. The receiving structure may receive LNG from the support unit before it is transported further. Alternatively, the receiving structure receives LNG before it is transported to the support unit.

The tie-in system is designed to support the transfer pipe, which may be in the form of a pipe, a floating flexible pipe, a hose, risers or other similar objects that is connected to a manifold of a process system on the support unit. The transfer pipe may be arranged to transfer a fluid, a multiphase fluid or a solid material such as a substance in powder form. The support unit may be a floating unit such as a semi-submersible platform, a gravity based non-floating unit, a ship, or other types of offshore or onshore units and terminals. A process system arranged on the support unit may comprise a single pipe element or a number of pipe elements. If the process system comprises a plurality of pipe elements, at least some of the pipe elements may be physically and fluidly connected to each other. The term "fluidly connected" means that two pipes and/or hoses are connected to each other such that fluid can be flowed from one of the pipes/hoses to the other of the pipes/hoses. The process system may further comprise one or more valve devices of various types and other types of devices in order to control the flow of fluid through pipe or the pipes of the process system.

The bending moments and shear forces which may be imposed on the manifold (the manifold is the flange connection or connections connecting the pipe element or elements to the transfer pipe or pipes) from the transfer pipe or pipes are substantially taken up by a chute device formed so as to allow the seaward end of the transfer pipe a limited angular displacement in the transverse and vertical directions. The angular displacement could be for example +/−30 degrees in the transverse direction of the transfer pipe and 30 degrees below the pipeline axis in the vertical direction. It should, however, be noted that the angular displacement can be more or less than the +/−30 degrees indicated above.

The chute device is preferably funnel shaped and narrow at the manifold end, and wide where the transfer pipe enters the sea. The sides and bottom of the chute device take up the transverse and vertical forces of the transfer pipe and transfers them to the support unit, via the chute support.

At the manifold of the process system, one or more brackets may be fixed to the structure of the support unit where the bracket/brackets is/are connected to a spool piece that is fixed to the end of the transfer pipe via a tie-in device. The tie-in device is preferably a mechanical holding device such as for example a turnbuckle, a rigging screw, a hydraulic tensioner or a fixed rod of a predetermined length. The spool piece is designed to allow it to be fitted to the end of the transfer pipe so that the transfer pipe can be attached and fix it to the brackets. As the chute device takes most of the transverse and vertical forces of the transfer pipe, the brackets take the axial forces of the transfer pipe. The process system on the support unit is so designed as to allow a limited amount of movement of the pipe element of the process system to which the transfer pipe is connected, for example +/−10 mm of axial movement in order to avoid the transfer of axial forces from the transfer pipe to the process system. Such movement allows for inexact axial alignment of the transfer pipe and/or difference in strain between the mechanical holding device and the manifold of the process system and/or thermal expansion or contraction of the process system, i.e. the pipe or pipes that the process system is comprised of. The process system may also be designed to allow movement in a transverse direction.

There is provided a tie-in system for tie-in of a transfer pipe or hose to a support unit where the transfer pipe is arranged at least partly in a body of water and the tie-in system comprises:

- a spool piece that in one end is adapted to be attached to the transfer pipe and in the other end to be connected to a pipe element arranged on the support unit,
- a chute device that is adapted to be attached to the support unit and to accommodate the transfer pipe such that the chute device supports the transfer pipe and takes up vertical and transverse forces acting on the transfer pipe,
- a tie-in device that is connected to the spool piece and is adapted to be connected to a tie-in member on the support unit such that tension loads are transferred from the transfer pipe to the support unit.

The transfer pipe is preferably a flexible pipe or hose that is capable of being bent to a certain degree. The transfer pipe may be a floating transfer pipe or a submerged transfer pipe or a combination of floating and submerged. The pipe element, to which the transfer pipe is attached on the support unit, is preferably a rigid pipe element. As with other flexible pipes or hoses, the transfer pipe has a minimum bending radius below which the transfer pipe should not be bent to avoid damage. Suitable pipes or hoses that can be used for transfer of various types of fluids and/or multiphase fluids (which may comprise solid particles and substances such as for example sand, gravel and so on) and/or bulk material such as a powder material are well known in the art and will not be further described herein.

The support unit is preferably a floating unit, a non-floating gravity based unit, a non-floating non-gravity based structure like a truss work or pillars with a deck mounted on top or an onshore termination or terminal. The support unit is further preferably a floating or non-floating structure to which a transfer pipe or hose that is arranged in water can be connected to. The support unit may be a structure that the fluid or a bulk material is transported via, i.e. the support unit acts as a transfer unit for the fluid or the bulk material which is transported from a supply structure to a receiving structure via the support unit/transfer structure. Alternatively the support unit can be either a supply structure or a receiving structure for the fluid that is transported through the transfer pipe, i.e. the fluid is not transported via the support unit.

The spool piece may be adapted to be disconnectably connected to a pipe element that is arranged on the support unit. For example, the spool piece may be provided with a spool piece flange that is attached to a corresponding flange element on the pipe element, for example with a number of bolts.

The spool piece may be a separate piece that is attached to the transfer pipe. The spool piece may be attached to the transfer pipe by bolts, screws or any other suitable fastening means. Alternatively, the spool piece may be an integral part of the transfer pipe. The spool piece may be securely attached to the transfer pipe by welding, adhesive, a combination of the two or any other suitable method for attaching the spool piece to the transfer pipe.

The spool piece may comprise a spool piece flange for attachment to a flange element on the pipe element on the support unit. The spool piece flange may be fastened to the flange element on the pipe element with bolts, screw or any other suitable fastening method.

The chute device preferably supports the transfer pipe in a region where the transfer pipe enters the support unit. This is because the transfer pipe is going from a level that is lower than the support unit, for example a water surface or from below a water surface, and up to the support unit. The transfer pipe is therefore subject to a certain degree of bending and the chute device is designed so that it will ensure that the transfer pipe is not bent beyond its minimum bending radius, i.e. the bending radius of the transfer pipe when it has been bent to the maximum without the transfer pipe being damaged. Thereby, damage to the transfer pipe is avoided.

The chute device preferably comprises a bottom member and two side members fastened to the bottom member such that the transfer pipe can be accommodated between the side members and be supported by the bottom member. The chute device may also be designed such that two or more transfer pipes may be arranged in a single chute device. In addition to supporting the transfer pipe, as mentioned above, the chute device will also take up transverse and vertical forces from the transfer pipe and transfer these forces to the support unit.

The chute device is preferably provided with an inboard section that is attached to the support unit and an outboard section that faces the body of water and is curved downwards when the chute device is attached to the support unit.

The chute device is preferably provided with a funnel shape having a gradually increasing width in the transverse direction. Hence, the bottom member of the outboard section and the side members are preferably arranged with gradually increasing width towards an outer end portion of the chute device that faces the body of water. This will allow the transfer pipe to bend vertically and transversally. However, the funnel-shape of the chute device is designed so that no damage to the transfer pipe occurs due to too small bending radius of the transfer pipe. Therefore, the outboard section of the chute device, i.e. the bottom member of the outboard section and/or the side members of the outboard section, is/are provided with a radius of curvature that is at least as large as, but preferably larger than the radius of curvature of the transfer pipe when it has reached its minimum bending radius without getting damaged.

The tie-in device may comprise a turnbuckle and/or a rigging screw and/or a hydraulic tensioner and/or a fixed rod of a predetermined length. Therefore, the spool piece preferably comprises a fastening member to which the tie-in device can be attached, where the fastening member is securely fastened to the spool piece, for example by welding, bolting or any other suitable fastening method or devices.

There is also provided a fluid transfer system for transfer of a fluid, a multiphase fluid or a bulk material such as a material in powder form between a floating or non-floating facility and a receiving structure via a support unit, where the fluid transfer system comprises the support unit, at least one transfer pipe and a process system comprising at least one pipe element that is arranged on the support unit, and where the at least one transfer pipe is connected to the at least one pipe element and is tied in to the support unit with a tie-in system as explained above.

The chute device is preferably attached to a chute support that is securely attached to the support unit.

The tie-in member is preferably securely attached to a tie-in support that is securely attached to the support unit. The tie-in system preferably comprises a first tie-in device and a second tie-in device that are arranged on opposite sides of the spool piece and the pipe element, i.e. on opposite sides of the plane generated by the longitudinal axis of the spool piece and a vertical axis intersecting the longitudinal axis.

The process system is preferably adapted to be movably supported on the support unit. Hence, the at least one pipe element of the process system is movably supported on the support unit. To arrange the process system so that it is movably supported on the support unit will allow forces acting on the process system from floating pipes and/or hoses and aerial pipes and/or hoses that are connected to the process system to be handled without causing damage to the process system. To arrange the process system so that it is movably supported on the support unit will also allow tension caused by thermal contractions and expansions to be handled so that the process system is not damaged.

The process system is preferably adapted to be movably supported in a longitudinal direction of the process system and/or a transverse direction of the process system where the transverse direction is substantially perpendicular to the longitudinal direction. The longitudinal direction is preferably the same direction as the longitudinal direction of the at least one pipe element of the process system at the point where the at least one pipe element is connected to the transfer pipe.

The transfer pipe is preferably fluidly connected to the receiving structure.

The term “receiving structure” used herein should be understood such that the receiving structure can be a structure receiving fluid that is transported from the support unit through the transfer pipe or a structure that feeds or supplies fluid to the transfer pipe which is subsequently transported to the support unit. The receiving structure may therefore be a floating or non-floating offshore or onshore terminal or any other type of floating or non-floating facility that is designed to receive fluid that is transported through the transport pipe from the support unit to the receiving structure. The receiving structure may also be a floating or non-floating offshore or onshore terminal or any other type of floating or non-floating structure that is designed to supply fluid for transport through the transport pipe from the receiving structure to the support unit. It should also be mentioned that one or more tie-in systems may be installed on the support unit and/or the receiving unit as required in each case.

The process system may also comprise at least one aerial hose that is fluidly connected to the at least one pipe element of the process system, where the at least one aerial hose is adapted to be connected to a floating or non-floating facility. If the fluid transported through the at least one transfer pipe is a cryogenic fluid, for example LNG, the floating or non-floating facility may for example be an LNG-carrier or an LNG-terminal.

Preferably, the process system comprises an aerial hose that is connected to the at least one pipe element and adapted to be connected to the floating or non-floating facility. Alternatively, the process system may not comprise any aerial hose. In this case the process system, which may comprise a single pipe, can be connected to a fluid tank or to a tank for bulk material or directly to an evaporator or to any other suitable device that is capable of receiving the fluid or bulk material that is transported through the process system.

Alternatively, the process system may also comprise a plurality of aerial hoses that are connected to the at least one pipe element, where the plurality of aerial hoses are adapted to be connected to the floating or non-floating facility.

Preferably, the at least one aerial hose or the plurality of aerial hoses is/are adapted to be disconnectably connected to the floating or non-floating facility.

The at least one aerial hose is preferably fluidly connected to the at least one pipe element, or the process system, with at least one break away coupling. The at least one pipe element may be connected to a plurality of aerial hoses, i.e. several aerial hoses are arranged in parallel. In this case, each of the aerial hoses is preferably fluidly connected to the at least one pipe element with a break away coupling.

The fluid transfer system preferably comprises at least one process system support device that is securely mounted to the support unit and/or the process system, where the at least one process system support device is adapted to allow the process system to move relative to the support unit in response to external forces acting on the process system. External forces may come, for example from the transfer pipe, the aerial hose or thermal contractions or extensions. The at least one process system support device may, for example, comprise a slide bearing, but any other suitable device may also be used where the process system is supported so that it may move relative to the support unit.

The fluid transfer system preferably comprises at least one limit stop that limits the movements of the at least one pipe element of the process system relative to the support unit in at least one direction. For example, the at least one process system support device may comprise at least one limit stop that limits the movements of the at least one pipe element of the process system relative to the support unit in at least one direction. The limit stops are present to ensure that the manifolds of the process system fulfill requirements for strength and also to ensure that the process system stays in place and is not dragged or pulled into the sea if the tie-in device fails. The at least one limit stop is preferably adapted to limit the movements of the at least one pipe element of the process system relative to the support unit in a longitudinal direction. The longitudinal direction is preferably the same direction as the longitudinal direction of the at least one pipe element of the process system at the point where the at least one pipe element is connected to the transfer pipe. Therefore, the at least one process system support device preferably comprises at least one limit stop that limits the movement of the at least one pipe element of the process system relative to the support unit in the longitudinal direction of the at least one pipe element. The at least one limit stop may also be adapted to limit the movements of the at least one pipe element of the process system relative to the support unit in a transverse direction where the transverse direction is substantially perpendicular to the longitudinal direction.

Preferably, the at least one limit stop that limits the movement of the at least one pipe element of the process system relative to the support unit in the longitudinal direction of the at least one pipe element is provided on the process system support device that is closest to the transfer pipe.

Furthermore, the limit stops in the longitudinal direction of the at least one pipe element is preferably provided with slack if that is required or considered to be necessary. That may be the case because if the limit stop is rigid and the tie-in devices are strained more than the at least one pipe element, between the limit stop and the flange element of the at least one pipe element to which the transfer pipe is connected, due to forces from the transfer pipe, large forces would be transferred to the at least one pipe element.

The at least one process system support device may further comprise at least one limit stop that limits the movement of the at least one pipe element of the process system relative to the support unit in the transverse direction of the at least one pipe element. The fluid transfer system may be provided with a plurality of limit stops that limit the movement of the at least one pipe element of the process system relative to the support unit in the transverse direction of the at least one pipe element.

The fluid transfer system may comprise one transfer pipe or two transfer pipes or more than two transfer pipes.

The fluid transfer system may comprise a first transfer pipe that is tied in to the support unit with a first tie-in system and a second transfer pipe that is tied in to the support unit with a second tie-in system. The first transfer pipe and the second transfer pipe are further preferably fluidly connected to the receiving structure. The first transfer pipe and the second transfer pipe may be tied in to the receiving structure with at least one tie-in device, but preferably a tie-in device according to the present invention for each of the first transfer pipe and second transfer pipe.

The process system may comprise a first pipe element and a second pipe element where the first pipe element is connected to the first transfer pipe and the second pipe element is connected to the second transfer pipe.

The process system may further comprise:

- a first cross over pipe that is fluidly connected to the first pipe element and the second pipe element,
- a second cross over pipe that is fluidly connected to the first pipe element and the second pipe element,
- a first valve device arranged in the first cross over pipe,
- a second valve device arranged in the second cross over pipe.
- a first cargo valve device that is provided in the first pipe element, and
- a second cargo valve device that is provided in the second pipe element The process system, when it is provided with a first pipe element and a second pipe element, may further comprise a first aerial hose that is connected to the first pipe element and to the floating or non-floating facility, and a second aerial hose that is connected to the second pipe element and to the floating or non-floating facility. Preferably, the first aerial hose and/or the second aerial hose is/are adapted to be disconnectably connected to the floating or non-floating facility.

The first cargo valve device is preferably arranged in the first pipe element between the first cross pipe connection and the third cross pipe connection. The second cargo valve device is preferably arranged in the second pipe element between the second cross pipe connection and the fourth cross pipe connection.

The fluid transfer system may comprise a plurality of transfer pipes that are tied in to the support unit with at least one tie-in system, but preferably with a number of tie-in systems corresponding to the number of transfer pipes.

The fluid that is transported with the present invention may be in the form of a liquid, a gas, a multiphase fluid, i.e. a mixture of liquid and/or gas and/or a solid material, or a bulk material such as material in powder form. As mentioned above, the present invention may be used for transfer of a cryogenic fluid, for example LNG (liquefied natural gas).

The first aerial hose is preferably connected to the first pipe element with a first break away coupling and the second aerial hose is preferably connected to the second pipe element with a second break away coupling. The first and second break away couplings will allow the disconnection of the first aerial hose and second aerial hose from the process system in case of emergency.

The process system may be provided with one or more emergency shut down valve devices. If the process system comprises a first pipe element and a second pipe element, the process system may be provided with a first emergency shut down valve device that is provided in the first pipe element and a second emergency shut down valve device that is provided in the second pipe element. The first emergency shut down valve device may be provided in the first pipe element between a first cross pipe connection where the first cross over pipe is fluidly connected to the first pipe element and a third connection where the second cross over pipe is fluidly connected to the first pipe element, and the second emergency shut down valve device may be provided in the second pipe element between a second cross pipe connection where the first cross over pipe is fluidly connected to the second pipe element and a fourth cross pipe connection where the second cross over pipe is fluidly connected to the second pipe element. Alternatively, for example if bulk material is being transported, the process system may not be provided with any emergency shut down valve devices.

The process system preferably comprises a vent mast that may be fluidly connected to the first pipe element on either side of the first cargo valve device or on either side of the first emergency shut down valve device, and to the second pipe element on either side of the second cargo valve device or on either side of the second emergency shut down valve device. Preferably the vent mast is fluidly connected to the first pipe element on either side of the one of the first cargo valve device and the first emergency shut down valve device that is arranged closest to the floating or non-floating facility. Preferably the vent mast is also fluidly connected to the second pipe element on either side of the one of the second cargo valve device and the second emergency shut down valve device that is arranged closest to the floating or non-floating facility. Generally, the vent mast is connected to the first pipe element and the second pipe element and any further pipe element of the process system such that any fluid that is trapped in the process system when the cargo valve devices and/or the emergency shut down and/or the breakaway valves are closed, may be vented through the vent mast.

It should be mentioned that there are several issues that are solved by the process system and fluid transfer system according to the present invention, especially when the fluid transferred through the transfer pipes is a cryogenic fluid, for example LNG (liquified natural gas). These issues include:

- The system enables recirculation and/or pre-cooling without the presence of the floating or non-floating facility.
- The system ensures that it is not shock cooled by quick transfer ramp-up and the system therefore enables recirculation and/or pre-cooling.
- The system ensures that pressure build-up in filling tanks in storage tanks of the receiving structure and/or running GCU (Gas Combustion Unit—a burner which combusts the BOG (Boil Off Gas) in a controlled manner without the risk of releasing unburned natural gas to the atmosphere) in emptying tanks is avoided.
- The system is capable of going into a safe state in case of emergency since the system provides a quick and safe emergency shut down and disconnect.
- The system ensures that dangerous pressure build-up due to trapped gas volumes is avoided.
- Furthermore, the system is preferably designed for vapor return.

Other features and advantages of the present invention will appear from the following description of preferred, non-limiting embodiments of the invention, with reference to the figures where:

Figure 1:
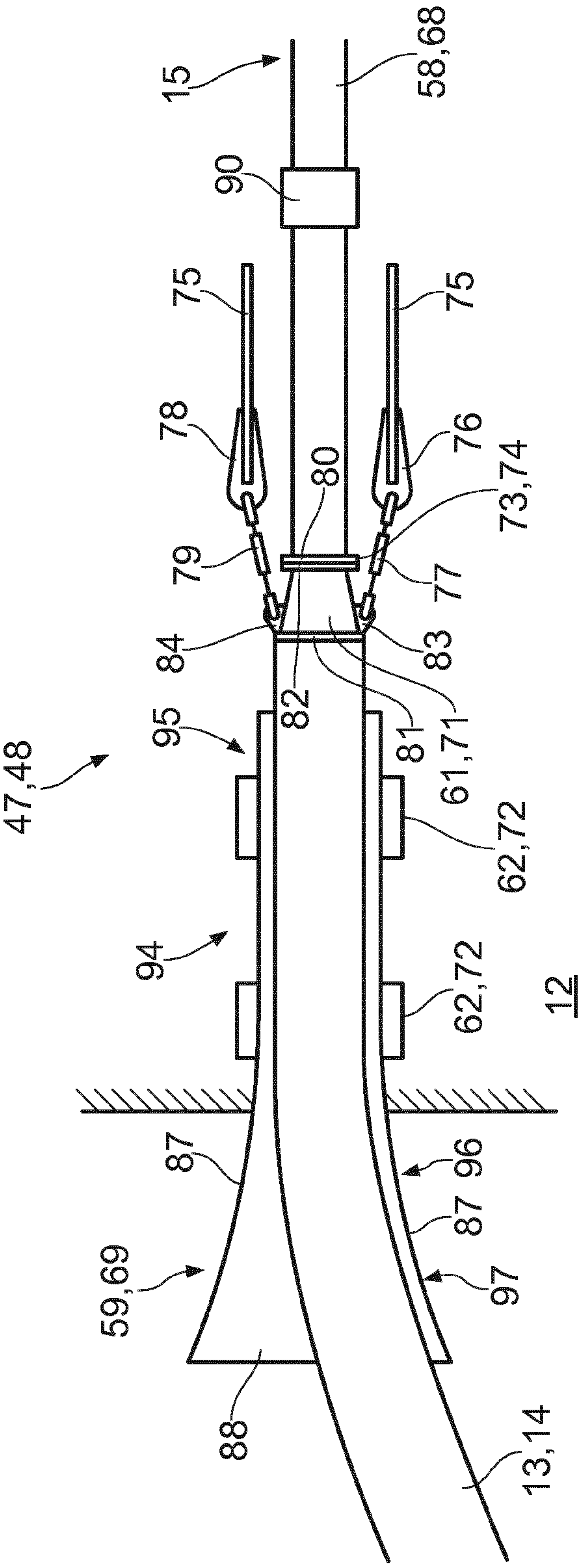
FIG. 1 shows a top view of a tie-in system according to the present invention, where a transfer pipe is connected/tied-in to a pipe element, or a process system that the pipe element is part of, on a support unit.
Figure 2:
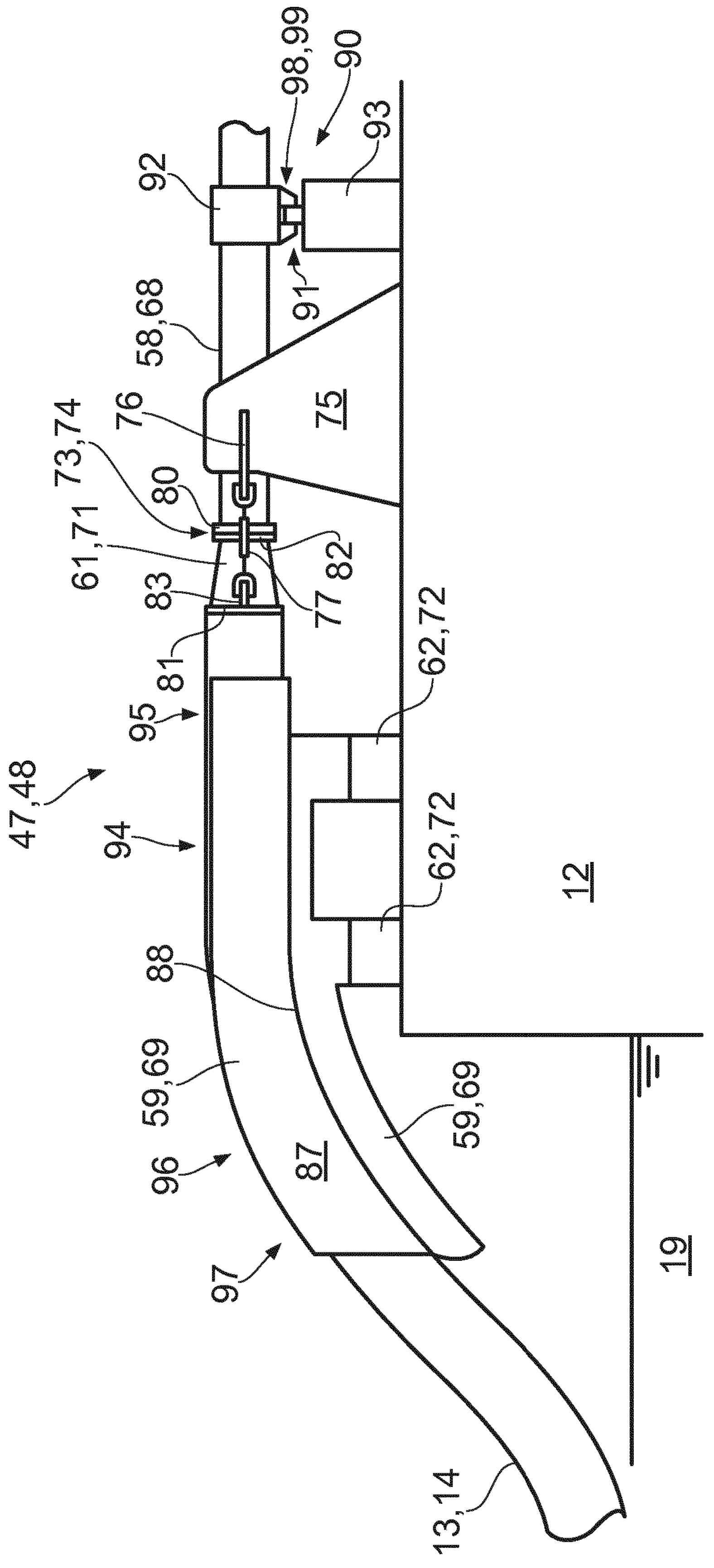
FIG. 2 shows a side view of the tie-in system shown in FIG. 1.
Figure 3:
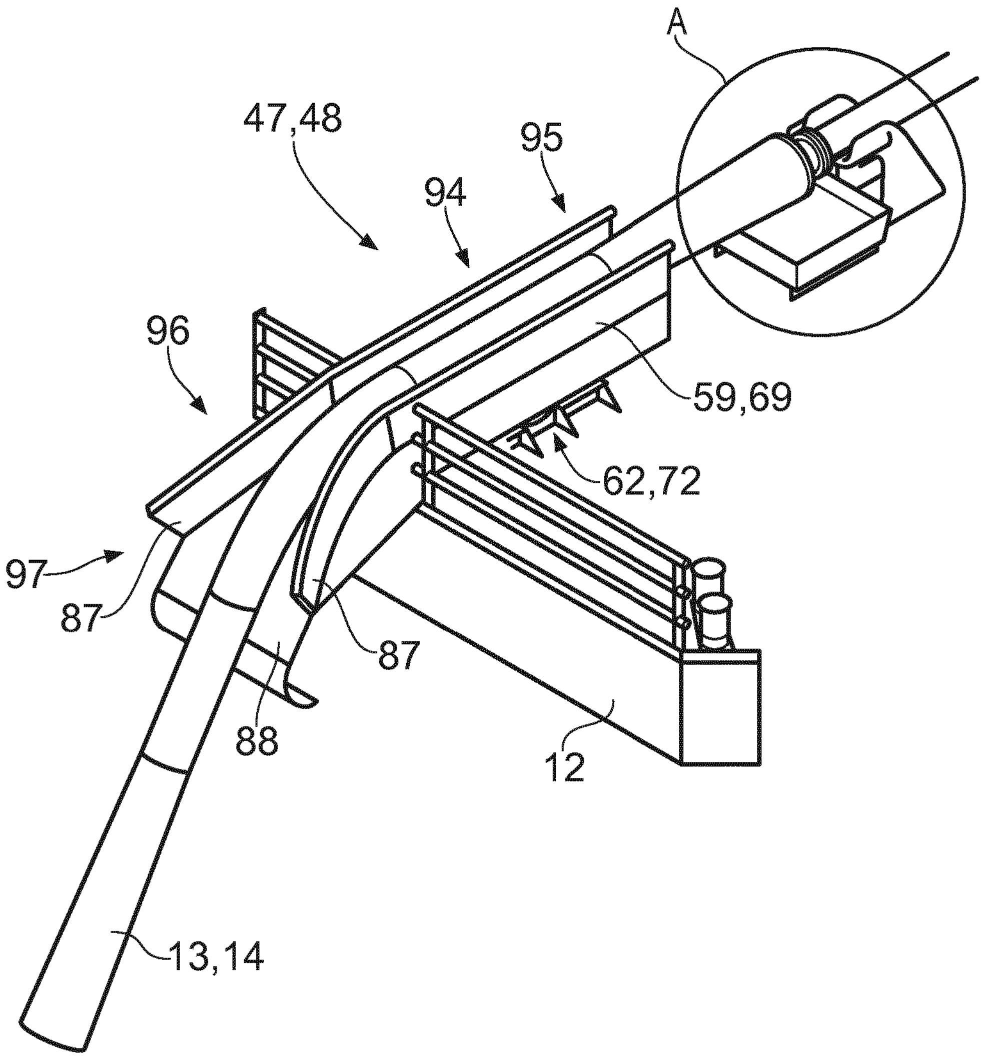
FIG. 3 shows a perspective view of the tie-in system shown in FIGS. 1 and 2.
Figure 4:
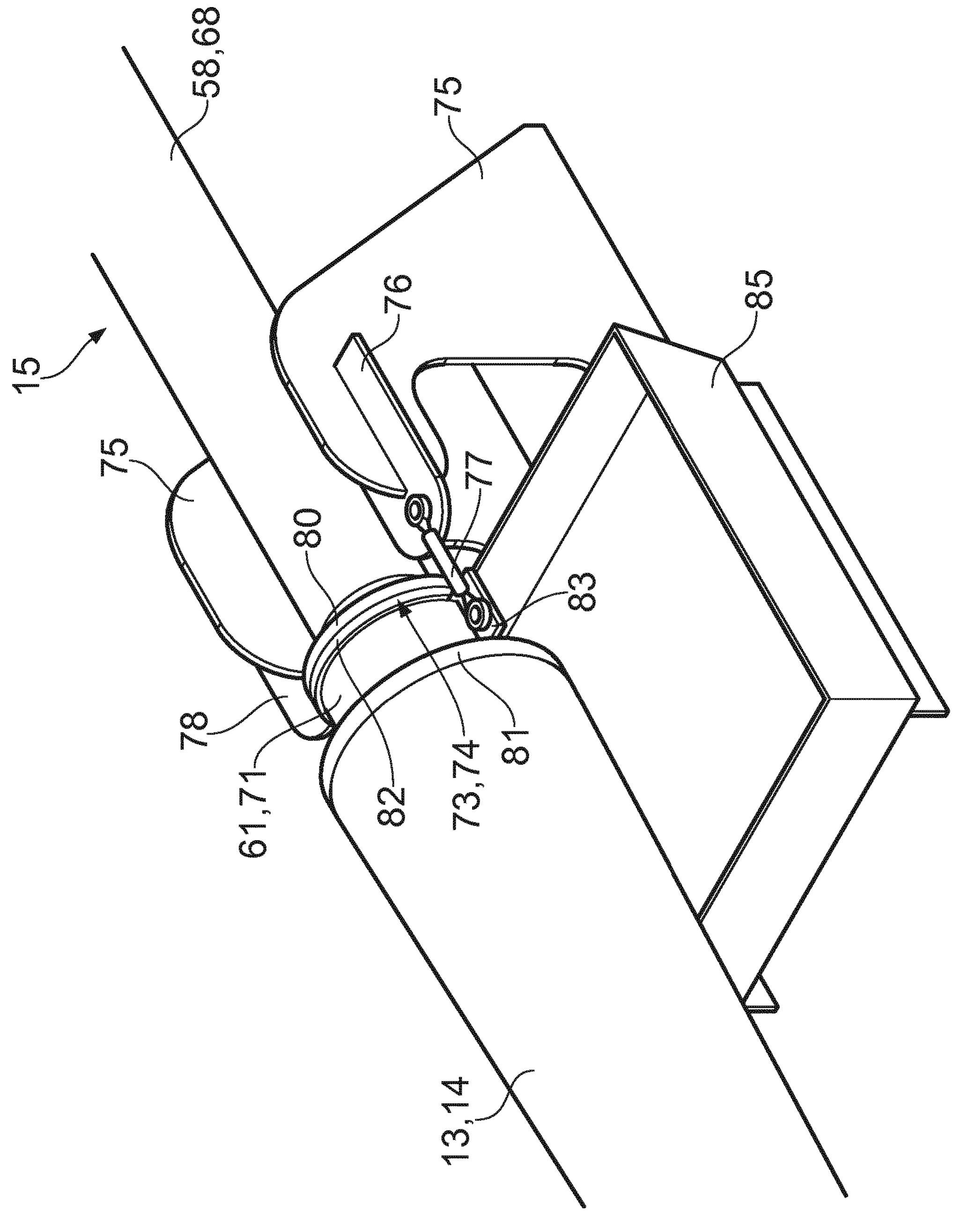
FIG. 4 shows an enlarged view of detail A indicated in FIG. 3.
Figure 5:
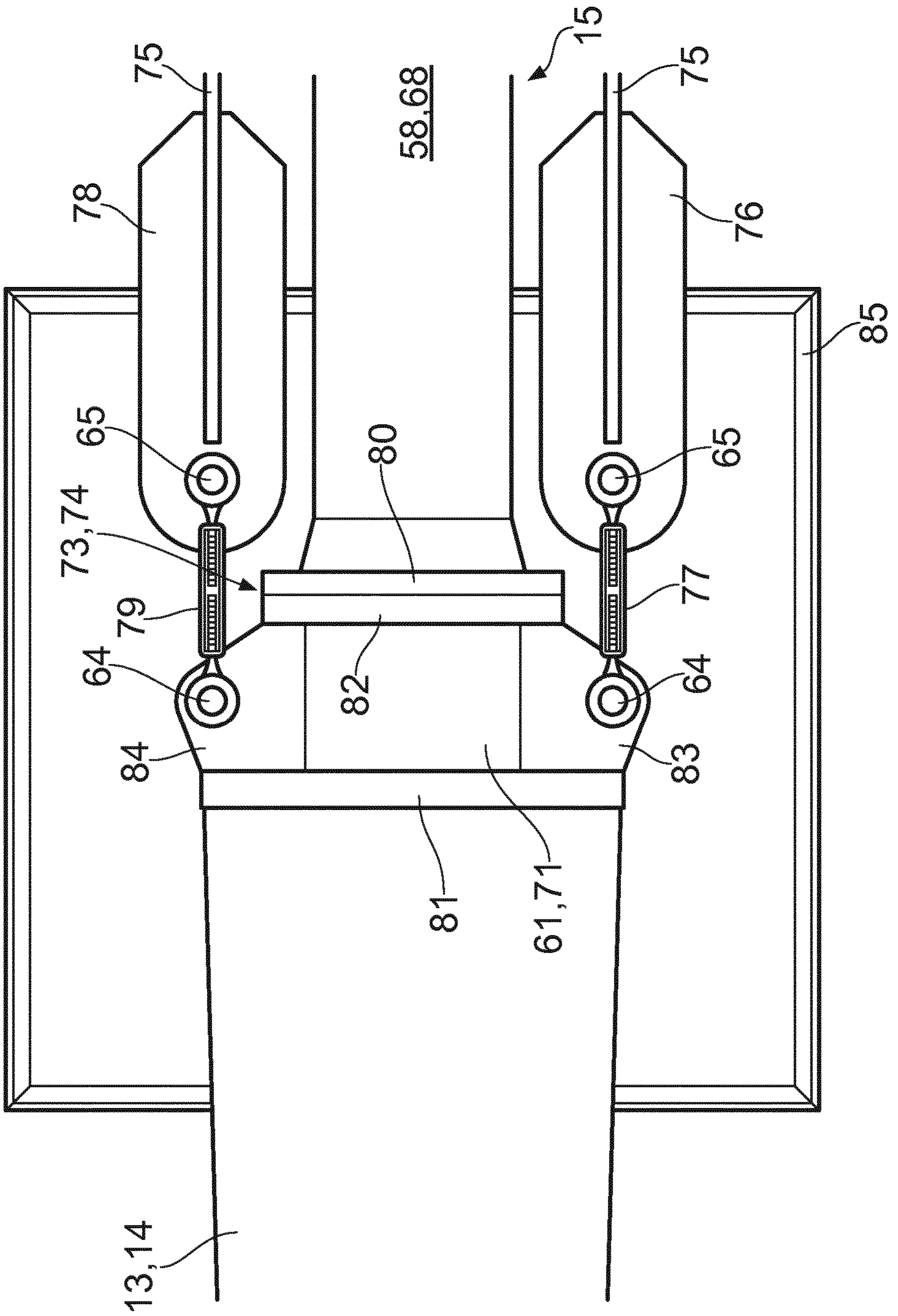
FIG. 5 shows a top view of detail A shown in FIG. 4.
Figure 6:
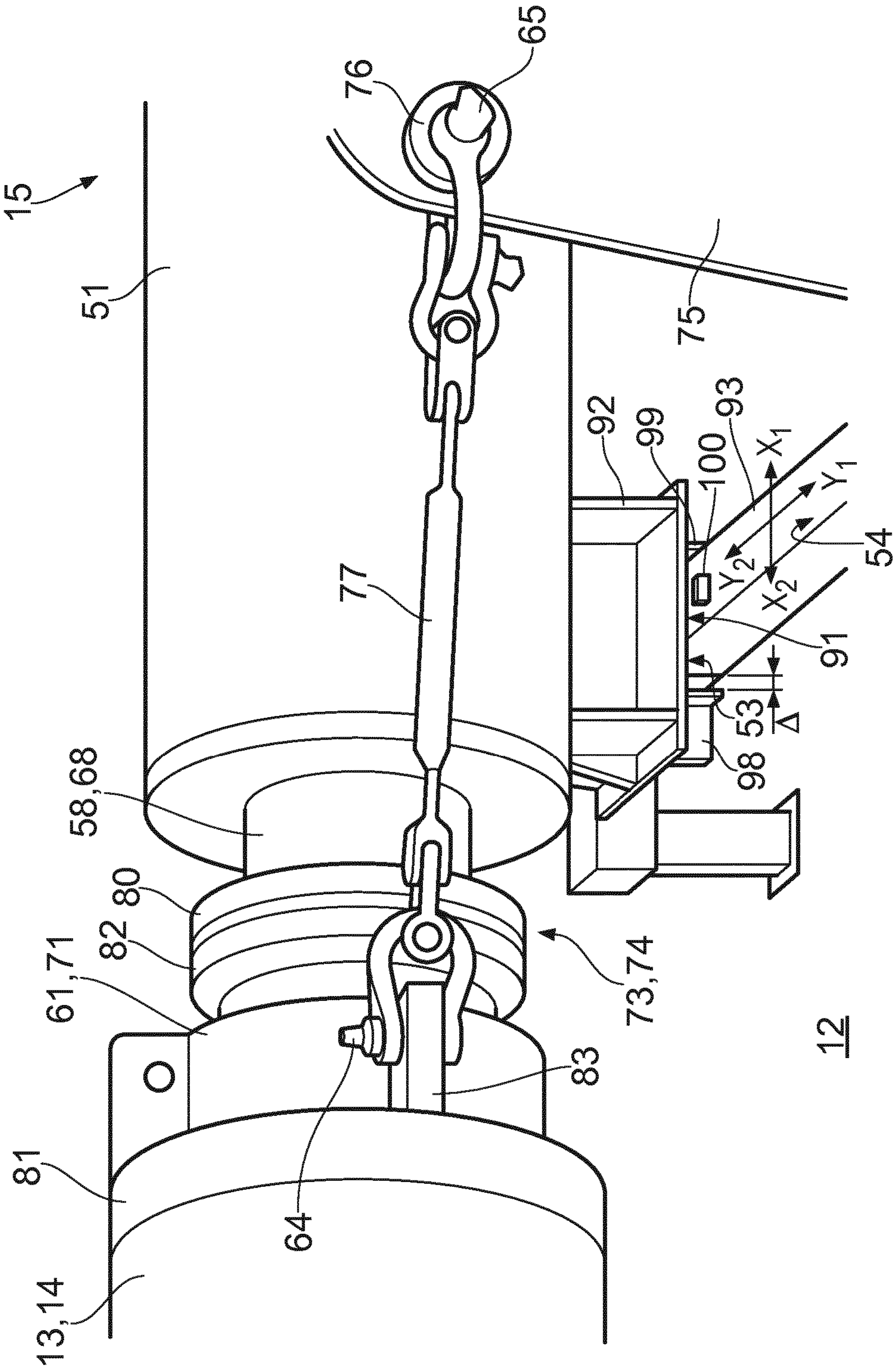
FIG. 6 shows a detailed view of the connection of the transfer pipe to the pipe element and a support device of the tie-in system shown in FIGS. 1-5, where the support device is designed to allow the pipe element, or the process system that the pipe element is part of, to move relative to the support unit in a substantially horizontal direction.
Figure 7:
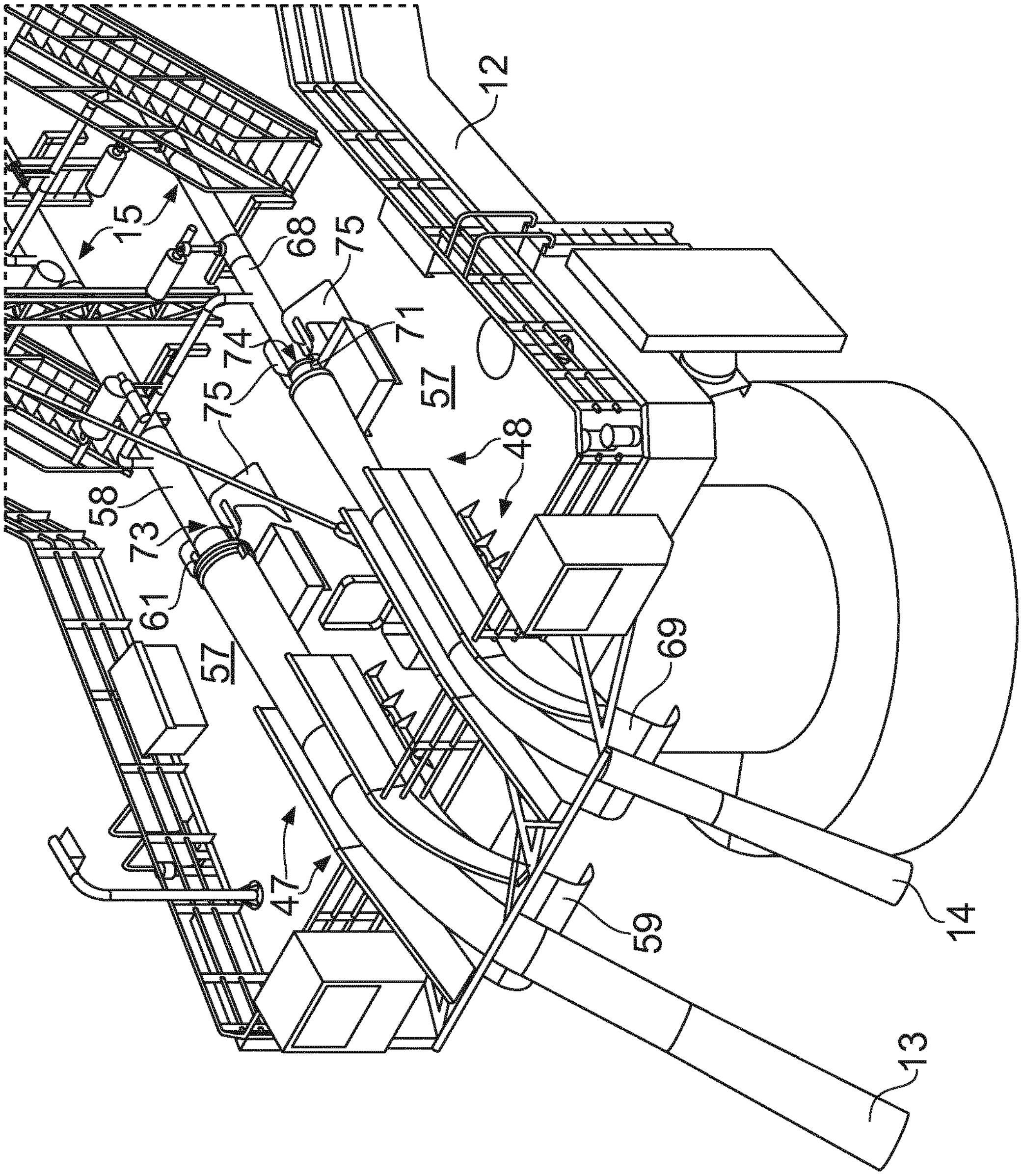
FIG. 7 shows two transfer pipes that are tied in to respective pipe elements in the same way as shown in FIGS. 1-6, where the pipe elements are part of a process system that is arranged on the support unit.
Figure 8:
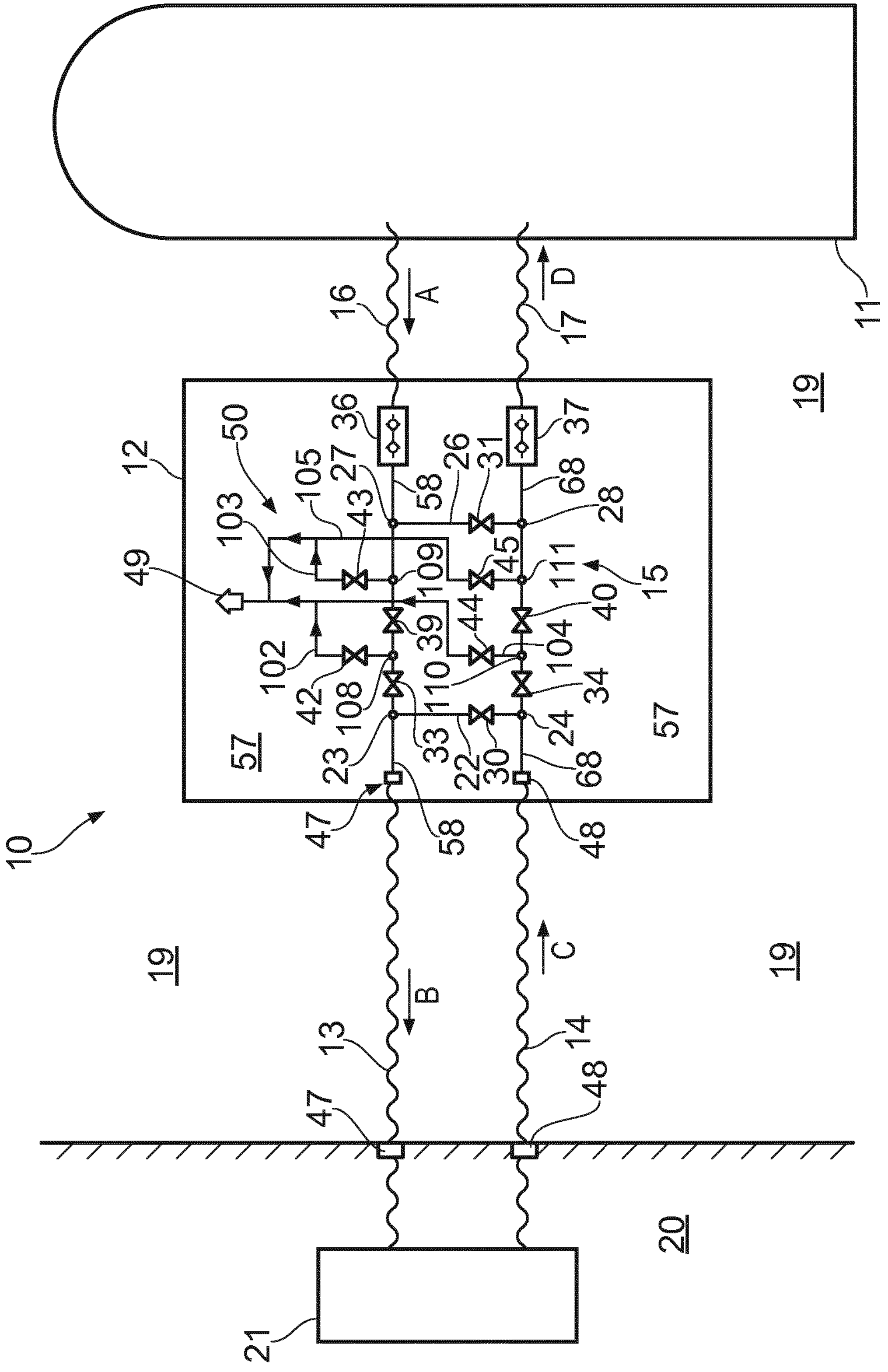

FIG. 8 schematically illustrates the tie-in system shown in FIGS. 1-7 where two transfer pipes are connected to respective pipe elements of a process system arranged on the support unit as shown in FIG. 7, and where the process system is connected to a vessel with aerial hoses.

Figure 9:
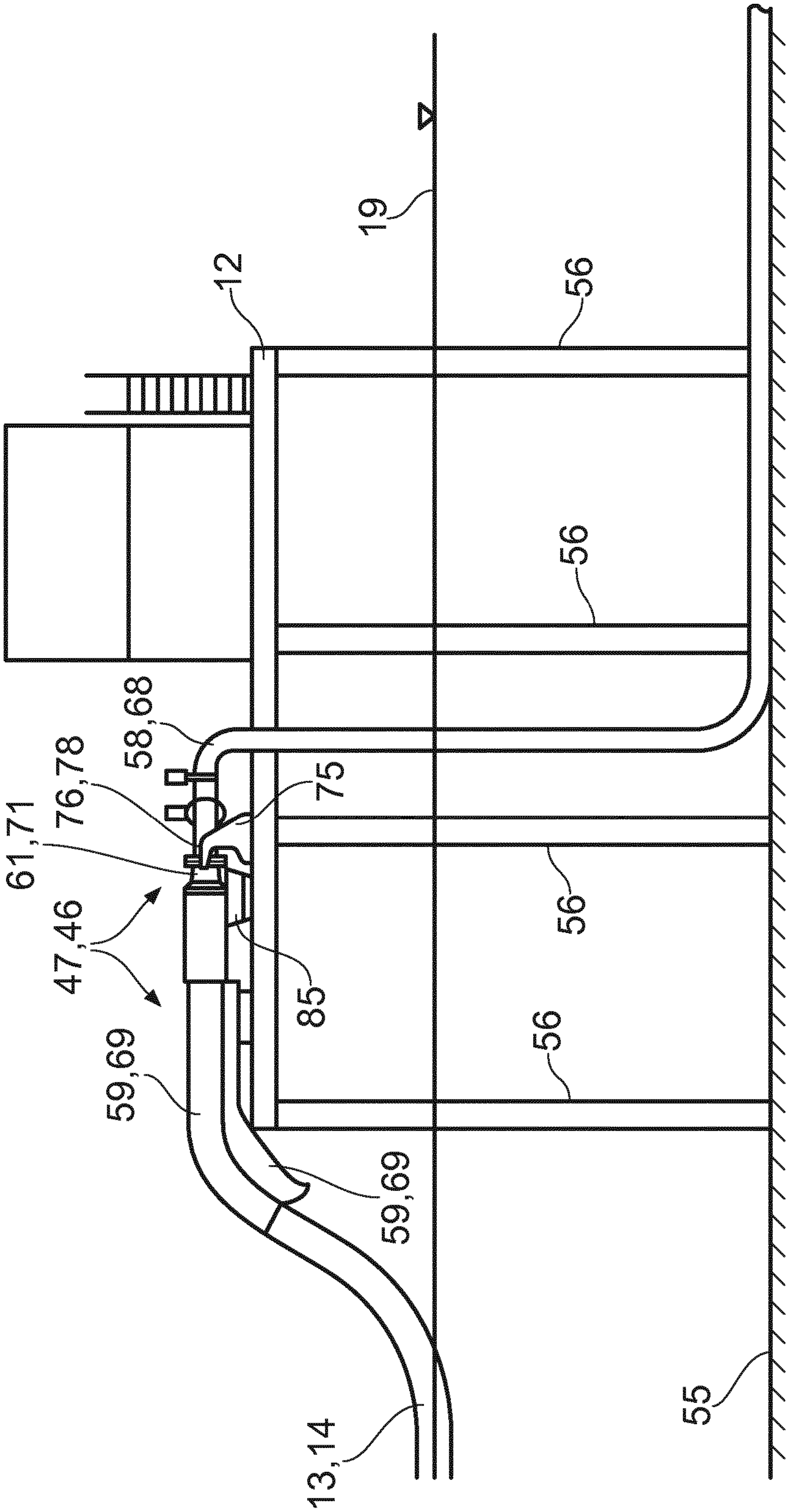

FIG. 9 shows a floating transfer pipe being connected to a pipe element of a process system on a support unit with legs that are attached to the seabed, where the transfer pipe is connected to the pipe element with a tie-in system as shown in FIGS. 1-6.

Figure 10:
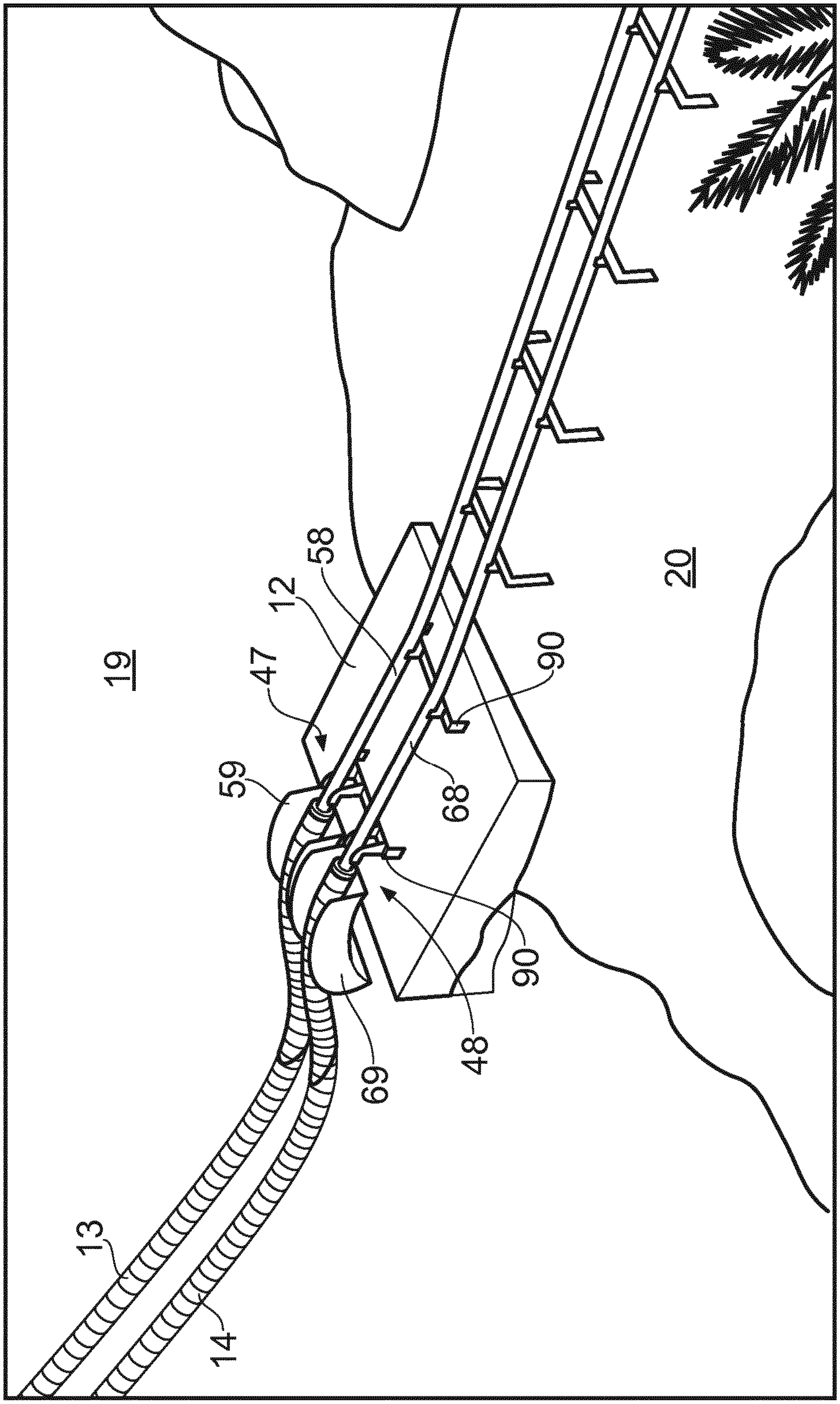

FIG. 10 shows two floating transfer pipes being connected to respective pipe elements of a process system on a support unit which arranged at least partly onshore, where the transfer pipes are connected to the respective pipe elements with a tie-in system as shown in FIGS. 1-6.

It should be mentioned that the same reference numbers are used for the same features of the present invention throughout in the figures.

In FIGS. 1-6 there is shown a tie-in system 47, 48 for transfer pipes 13, 14, or preferably flexible hoses, that extend from a receiving structure 21, for example a location on-shore or on a pier or a similar structure, or a floating structure, to a support unit 12. The receiving structure 21 is preferably a location that includes a storage facility for a fluid, for example a cryogenic liquid such as LNG (Liquified Natural Gas), or a bulk material like a powder.

The support unit 12 may be a floating unit such as a semi-submersible platform, a non-gravity based non-floating unit, a gravity based non-floating unit, a ship, or other types of offshore or onshore units and terminals.

The receiving structure 21 can be a structure receiving fluid or bulk material that is transported from the support unit 12 through the transfer pipe 13, 14 or a structure that feeds or supplies fluid to the transfer pipe 13, 14 which is subsequently transported to the support unit 12 through the transfer pipes 13, 14. The receiving structure 21 may therefore be a floating or non-floating offshore or onshore terminal or any other type of floating or non-floating structure that is designed to receive fluid or bulk material that is transported through the transport pipe 13, 14 from the support unit 12 to the receiving structure 21. The receiving structure 21 may also be a floating or non-floating offshore or onshore terminal or any other type of floating or non-floating structure that is designed to supply fluid or bulk material for transport through the transport pipe 13, 14 from the receiving structure 21 to the support unit 12. It should also be mentioned that one or more tie-in systems 47, 48 may be installed on the support unit 12 and/or the receiving unit 21 as required in each instance.

A fluid transfer system 10 that comprises one or more tie-in systems 47, 48 for the at least one transfer pipe 13, 14, is also provided. Further, a process system 15 can be arranged on a deck 57 of the support unit 12, as indicated in FIG. 8, and can be connected to the at least one transfer pipe 13, 14. The process system 15 may be a single pipe that is arranged on the support unit 12 and is connectable to the at least one transfer pipe 13, 14. The process system 15 may alternatively be a more complex system of pipes that are arranged on the support unit 12 where the process system 15 comprises at least one pipe element 58, 68 that is connectable to the at least one transfer pipe 13, 14. An example of a more complex process system 15 is shown in FIG. 8 and will be further described below.

The tie-in system 47, 48 comprises a chute device 59, 69 that is adapted to be securely attached to the support unit 12. The chute device 59, 69 supports the transfer pipe 13, 14 that is arranged in the chute device 59, 69 and will take up forces and bending moments on the transfer pipe 13, 14 caused by high sea states, currents, winds, ice conditions and so on, and transfer the forces and bending moments to the support unit 12.

The support unit 12 is provided with at least one, but preferably two or more chute supports 62, 72 that are securely fastened to the support unit 12, for example by welding or with bolts, screws or any other suitable fastening devices. Consequently, the chute device 59, 69 is adapted to be securely attached to the chute supports 62, 72, for example by welding or with bolts, screws or any other suitable fastening devices.

The chute device 59, 69 comprises an inboard section 94 with an inner end portion 95 that will be arranged on the support unit, and an outboard section 96 that at least partly extends outside the outer edges of the support unit 12 and has an outer end portion 97. The chute device 59, 69 comprises a bottom member 88 and two side members 87 that are securely fastened to the bottom member 88 such that the chute device 59, 69 is funnel shaped and supports the transport pipe 13, 14 when it is arranged in the chute device 59, 69.

In the outboard section 96 of the chute device 59, 69 the bottom member 88 is preferably curved downwards in a direction from the inboard section 94 towards the outer end portion 97 of the chute device 59, 69 as indicated in the figures. The bottom member 88 preferably also gradually widens in a direction from the inboard section 94 towards the outer end portion 97 of the chute device 59, 69 as indicated in the figures. This shape of the chute device 59, 69 will allow the transfer pipe 13, 14 to bend vertically and transversally as the transfer pipe 13, 14 enters the support unit 12.

The funnel-shaped chute device 59, 69 is further designed so that no damage to the transfer pipe 13, 14 occurs due to too much bending of the transfer pipe 13, 14 as it enters the support unit 12. The bottom member 88 and the side members 87 of the outboard section 96 are preferably provided with a radius of curvature that is at least as large as, but preferably larger than the radius of curvature of the transfer pipe 13, 14 when it has reached its maximum bending radius without getting damaged. It is therefore ensured that the bending of the transfer pipe 13, 14 will be kept within the maximum bending limit of the transfer pipe as it enters the support unit 12.

The tie-in system 47, 48 further comprises a spool piece 61, 71 that may be adapted to be securely attached to the end of the transfer pipe 13, 14. The spool piece 61, 71 may be attached to the transfer pipe 13, 14 in a conventional way, for example with bolts, welding or any other suitable fastening means. It would also be possible to make the spool piece 61, 71 an integral part of the transfer pipe 13, 14 when the transfer pipe 13, 14 is fabricated. Alternatively, the spool piece 61, 71 and/or transfer pipe 13, 14 can be disconnectably/releasably attached to the pipe element 58, 68 with a QCDC device (Quick Connection DisConnection) with hydraulic and/or mechanical brackets gripping the flange of the spool peace 61, 71 and/or transfer pipe 13, 14.

The spool piece 61, 71 is preferably made of steel and may be provided with a spool piece connector 81 for the attachment of the spool piece 61, 71 to the transfer pipe. The spool piece connector 81 can be a flange element that is an integral part of the spool piece 61, 71 or is securely attached to the spool piece 61, 71 with fastening means such as bolts, screw or other suitable fastening means.

The spool piece 61, 71 is preferably connected to the pipe element 58, 68 with a flange connection 73, 74. The spool piece 61, 71 is provided with a spool piece flange 82 that is adapted to be attached to a corresponding flange element 80 that is arranged on a pipe element 58, 68 that is arranged on the support unit 12. The spool piece flange 82 can be attached to the flange element 80 to form the flange connection 73, 74 by welding or with a suitable number of conventional bolts (not shown in the figures), but any other suitable fastening means may be used.

Under the flange connection 73, 74 comprising the spool piece flange 82 and the flange element 80, a fluid collector 85 may be arranged as indicated in FIG. 5 in order to collect any fluid that that condenses or leaks from the flange connection.

The pipe element 58, 68 may be provided with a layer of insulation 51 as shown in FIG. 6 and may, as mentioned above, be a part of a more complex process system 15 as indicated in FIG. 8. The transfer pipe 13, 14 may alternatively be connected to a single pipe 58, 68 that is arranged on the support unit 12, i.e. the process system 15 is made up of a single pipe 58, 68 or pipes 58, 68 that are each connected to a transfer pipe 13, 14 but are not fluidly interconnected.

The spool piece 61, 71 is further provided with at least one spool piece tie-in member but preferably two or more spool piece tie-in members 83, 84. The spool piece tie-in members 83, 84 may be an integral part of the spool piece 61, 71. Alternatively, the spool piece tie-in members 83, 84 can be securely attached to the spool piece 61, 71 with bolts, screw or any other suitable fastening means.

The spool piece tie-in members 83, 84 are adapted so that a tie-in device 77, 79 can be securely attached to the spool piece tie-in members 83, 84. The tie-in members 83, 84 may, for example, be provided with a bolt hole so that the tie-in devices 77, 79 can be attached to the spool piece tie-in members 83, 84 with respective tie-in bolts 64 as indicated in FIGS. 5 and 6.

The support unit 12 are further provided with one or more tie-in supports 75. The tie-in supports 75 are securely attached to the support unit 12, typically to a deck of the support unit 12, for example with bolts or screw or any other suitable fastening means, or by welding the tie-in supports 75 to the support unit 12.

The tie-in supports 75 may be provided with at least one tie-in member, but preferably two or more tie-in members 76, 78. The tie-in members 76, 78 are securely attached to the tie-in supports 75 by welding or with bolts or any other suitable fastening means. The tie-in members 76, 78 may be formed as an integral part of the tie-in support 75. The tie-in members 76, 78 are adapted so that the tie-in devices 77, 79 can be securely attached to respective tie-in members 76, 78 with bolts, welding or any other suitable fastening means. The tie-in members 76, 78 may, for example, each comprise a bolt hole so that the tie-in devices 77, 79 can be attached to the tie-in members 76, 78 with respective tie-in bolts 65 as indicated in FIGS. 5 and 6.

If the tie-in members 76, 78 is formed as an integral part of the tie-in supports 75, the tie-in devices will be adapted for the tie-in devices 77, 79 to be directly attached to the tie-in supports 75. The tie-in supports 75 may, for example, be provided with respective bolt holes so that the tie-in devices can be attached to the tie-in supports 75 with tie-in bolts, preferably of the same type as shown in FIGS. 5 and 6.

As indicated above, the tie-in system 47, 48 further comprises at least one tie-in device, but preferably two or more tie-in devices 77, 79. The tie-in devices 77, 79 are in one end adapted to be disconnectably connected to respective spool piece tie-in members 83, 84, for example with a bolt connection 64 as indicated above and shown in the figures. In the other end the tie-in devices 77, 79 are adapted to be disconnectably connected to respective tie-in members 76, 78, or directly to respective tie-in supports 75, for example with a bolt connection 65 as indicated above and shown in the figures.

When in use and the tie-in devices are attached to respective spool piece tie-in members 83, 84 and respective tie-in members 76, 78, the tie-in devices 77, 79 will transfer tension loads from the transfer pipe 13, 14 to the support unit 12. Thereby the flange connection 73, 74 connecting the transfer pipe 13, 14 to the pipe element 58, 68 will not need to take up any substantial tension loads from the transfer pipe 13, 14. The tie-in devices 77, 79 can be a mechanical holding device such as for example a turnbuckle, a rigging screw, a hydraulic tensioner, a fixed rod of a predetermined length or any other suitable device that is capable of transferring tension loads from the transfer pipe 13, 14 to the support unit 12. Typically two tie-in devices 77, 79 are arranged on opposite sides of both the spool piece 61, 71 and the pipe element 58, 68 as indicated in the figures are used to take up the tension loads from the transfer pipe 13, 14, but obviously any other number of tie-in devices 76, 78 may be employed to take up the tension loads.

Although the forces of the transfer pipe 13, 14 are taken by the chute device 59, 69 and the tie-in supports 75, it is preferable that such loads are not transmitted to the fixed flange connection 73, 74 and the pipe element 58, 68 due to misalignment of the pipe element 58, 68 and the spool piece 61, 71, thermal expansion or contraction, difference in strain between the tie-in device 77, 79 and the pipe element 58, 68 or by other means. Therefore, the pipe element 58, 68 may be adapted to be able to move to a limited extent in the longitudinal/axial direction as indicated by arrows $X_1$ and $X_2$ in FIG. 6, and/or in the transverse direction as indicated by arrows $Y_1$ and $Y_2$ in FIG. 6.

The pipe element 58, 68 of the process system 15 is preferably supported on at least one support device 90, but preferably a plurality of process system support devices 90 that comprises a lower support element 93 and an upper support element 92 as shown in FIG. 6. The lower support element is preferably securely attached to the support unit 12, for example by welding, bolts or any other suitable fastening means. The upper support element 92 is preferably attached to the pipe element 58, 68, for example with bolts, one or more clamps, by welding or any other suitable fastening means. The upper support element 92 rests on the lower support element 93. Preferably the upper support element 92 is provided with a substantially plane upper support surface 53 and the lower support element 93 is provided with a corresponding substantially plane lower support surface 54 such that the upper support surface 53 and the lower support surface forms a slide bearing 91. The pipe element 58, 68 is thereby capable of moving in a substantially horizontal direction in response to forces from the transfer pipe 13, 14 acting on the pipe element 58, 68.

In order to limit the extent of the movement of the pipe element 58, 68 in a substantially horizontal direction, at least one limit stop 98, 99, 100 may be provided that will limit the movement of the pipe element 58, 68 in a longitudinal direction of the pipe element, i.e. the axial direction of the pipe element 58, 68 at the point where the pipe element 58, 68 is connected to the spool piece 61, 71, and/or a transverse direction, i.e. a direction that is substantially perpendicular to the longitudinal direction of the pipe element 58, 68.

As indicated in FIG. 6, the longitudinal movements of the pipe element 58, 68, as indicated by arrows $X_1$ and $X_2$, may be limited by providing the upper support element 92 with a first longitudinal limit stop 98 and/or a second longitudinal limit stop 99.

The first longitudinal limit stop 98 shown in FIG. 6, comprises a substantially vertical, structural element that is securely attached to the upper support element 92 projecting downwards from the upper support element 92 such that first longitudinal limit stop 98 will abut the lower support element 93 when the transfer pipe 13, 14 pushes the pipe element 58, 68 in the direction of arrow $X_1$ in FIG. 6. When the first longitudinal limit stop 98 abuts the lower support element 93, the pipe element 58, 68 is prevented from moving any further in the longitudinal direction away from the chute device 59, 69, i.e. in the direction of arrow $X_1$ in FIG. 6.

In a similar way, the second longitudinal limit stop 99 comprises a substantially vertical, structural element that is securely attached to the upper support element 92 projecting downwards from the upper support element 92 such that the second longitudinal limit stop 99 will abut the lower support element 93 when the pipe element 58, 68 is pushed in the direction of arrow $X_2$ in FIG. 6. When the second longitudinal limit stop 99 abuts the lower support element 93, the pipe element 58, 68 is prevented from moving any further in the direction of arrow $X_2$ in FIG. 6.

As further indicated in FIG. 6, the transverse movements of the pipe element 58, 68 may, as indicated by arrows $Y_1$ and $Y_2$, be limited by providing the lower support element 93 with a first transverse limit stop 100 and/or a second transverse limit stop (not visible in the FIG. 6).

The first transverse limit stop 100 shown in FIG. 6, comprises a substantially vertical, structural element that is securely attached to the lower support element 93 projecting upwards from the lower support element 93 such that first transverse limit stop 100 will abut the upper support element 92 when the pipe element 58, 68 is pushed in the direction of arrow $Y_1$ in FIG. 6. When the first transverse limit stop 100 abuts the upper support element 92, the pipe element 58, 68 is prevented from moving any further in the transverse direction in the direction of arrow $Y_1$ in FIG. 6.

In a similar way, the second transverse limit stop on the opposite side of the pipe element 58, 68 as compared to the first transverse limit stop (not visible in FIG. 6 as mentioned above), comprises a substantially vertical, structural element that is securely attached to the lower support element 93 projecting upwards from the lower support element 93 such that second transverse limit stop will abut the upper support element 92 when the pipe element 58, 68 is pushed in the direction of arrow $Y_2$ in FIG. 6. When the second transverse limit stop abuts the upper support element 92, the pipe element 58, 68 is prevented from moving any further in the transverse direction in the direction of arrow $Y_2$ in FIG. 6.

The distance that the pipe element 58, 68 is allowed to move in the longitudinal direction is indicated by the Greek letter Δ in FIG. 6. The distance Δ may vary from one installation to another or one embodiment of the process system 15 to another, depending on various factors like the forces acting on the transfer pipes 13, 14, the elasticity of the tie-in device 77, 79, how much thermal expansion and contraction that must be allowed for and how much room there is on the support unit 12 for movement of the pipe element 58, 68 and the rest of the process system 15 in the longitudinal and transverse directions.

In FIG. 7 a support unit 12 is shown where two transfer pipes 13, 14 are connected to two pipe elements 58, 68 where each transfer pipe 13, 14 is tied in with two tie-in systems 47, 48 of the same design as described above. A first transfer pipe 13 is tied in with a first tie-in system 47 and connected to a first pipe element 58 with a first flange connection 73 and a second transfer pipe 14 is tied in with a second tie-in system 48 and connected to a second pipe element 68 with a second flange connection 74.

As described above, the first tie-in system 47 comprises a first chute device 59 in which the first transfer pipe 13 is arranged while the second tie-in system 48 comprises a second chute device 69 in which the second transfer pipe 14 is arranged. The first chute device 59 and the second chute device 69 are both preferably designed and securely attached to the support unit 12 as shown in FIGS. 1-6 and described in detail above.

The first tie-in system 47 comprises a first spool piece 61 that is securely attached to the first transfer pipe 13 in one end thereof. In the other end the first spool piece 61 is connectable to a first pipe element 58 of a process system 15 with a flange connection 73. The second tie-in system 48 comprises a second spool piece 71 that is securely attached to the second transfer pipe 14 in one end thereof. In the other end the second spool piece 71 is connectable to a second pipe element 68 of a process system 15 with a flange connection 74. The first flange connection 73 and the second flange connection 74 preferably have the same design as shown in FIGS. 1-6 and described in detail above. As already indicated above, the process system 15 may be designed with the first and second pipe elements 58, 68 only which are connected to the first and second transfer pipes 13, 14 respectively. Alternatively, as shown in FIGS. 7 and 8, the process system 15 may comprise a more complex pipe system with a plurality of fluidly interconnected pipe elements, including the pipe elements 58, 68 that are connected to the transfer pipes 13, 14.

The first tie-in system 47 further comprises at least one tie-in device, but preferably two tie-in devices 77, 79 that are connected to respective spool piece tie-in members 83, 84 arranged on the first spool piece 61 and to respective tie-in members 76, 78 on tie-in supports 75 where the tie-in supports 75 are securely attached to the support unit 12. The second tie-in system 48 also comprises at least one tie-in device, but preferably two tie-in devices 77, 79 that are connected to respective spool piece tie-in members 83, 84 arranged on the second spool piece 71 and to respective tie-in members 76, 78 on tie-in supports 75 where the tie-in supports 75 are securely attached to the support unit 12. Generally, the tie-in devices 77, 79 of the first tie-in system 47 and the second tie-in system 48 are all preferably designed and attached to respective spool piece tie-in members 83, 84 and respective tie-in members 76, 78 as shown in FIGS. 1-6 and described in detail above.

Further, as described above, the tie-in devices 77, 79 of the first tie-in system 47 and the second tie-in system 48 can be mechanical holding devices such as turnbuckles, rigging screws, hydraulic tensioners, fixed rods of a predetermined length or any other suitable devices that are capable of transferring tension loads from the first and second transfer pipes 13, 14 to the support unit 12. Typically two tie-in devices 76, 78 arranged on opposite sides of the first spool piece 61 and the first pipe element 58 as indicated in the figures are used to take up the tension loads from the transfer pipe 13 and two tie-in devices 76, 78 arranged on opposite sides of the second spool piece 71 and the second pipe element 68 as indicated in the figures are used to take up the tension loads from the transfer pipe 14, but obviously any other number of tie-in devices 76, 78 may be employed to take up the tension loads from both the first transfer pipe 13 and the second transfer pipe 14.

In FIG. 8 the process system 15, as partially shown in FIG. 7, is shown schematically arranged on the support unit 12. The process system comprises the first pipe element 58 that is connected to the transfer pipe 13 as shown in detail in FIGS. 1-7 and described in detail above. The process system further comprises the second pipe element 68 that is connected to the transfer pipe 14 as shown in detail in FIGS. 1-7 and described in detail above.

FIG. 8 illustrates a typical use of the present invention where a floating or non-floating facility 11 may be a LNG-carrier 11 that carries LNG (Liquefied Natural Gas), the support unit 12 may be a floating unit 12 and the receiving structure 21 may be an onshore LNG-facility that is capable of receiving LNG from the LNG-carrier via the floating unit 12 and/or to send LNG to the LNG-carrier 11 via the floating unit 12. Obviously, other configurations of the floating or non-floating facility 11, the support unit 12 and the receiving structure 21 of the present invention is also possible.

The first transfer pipe 13 is tied in to the support unit 12 with a first tie-in system 47 as indicated in FIG. 8 and shown in detail in FIGS. 1-7 and described in detail above. The second transfer pipe 14 is tied in to the support unit 12 with a second tie-in system 48 as indicated in FIG. 8 and shown in detail in FIGS. 1-7 and described in detail above.

The first transfer pipe 13 and the second transfer pipe are further connected to a receiving structure 21. As indicated in FIG. 8, the receiving structure may be an onshore structure or facility, but may obviously also be arranged offshore, either as a floating structure or arranged on legs, a pier or some other type of structure that is fixed to the seabed.

It should be noted that although two transport pipes 13, 14 are shown in FIG. 8, it would be possible to provide the system with any desirable number of transport pipes depending on requirements for the project in question.

The receiving structure 21 can be a structure receiving fluid that is transported from the support unit 12 through the first and second transfer pipes 13, 14 or a structure that feeds or supplies fluid to the first and second transfer pipes 13, 14 which is subsequently transported to the support unit 12. The receiving structure 21 may therefore be a floating or non-floating offshore or onshore terminal or any other type of floating or non-floating structure that is designed to receive fluid that is transported through the first and second transfer pipes 13, 14 from the support unit 12 to the receiving structure 21. The receiving structure 21 may also be a floating or non-floating offshore or onshore terminal or any other type of floating or non-floating structure that is designed to supply fluid for transport through the first and second transfer pipes 13, 14 from the receiving structure 21 to the support unit 12.

It should also be mentioned that one or more tie-in systems 47, 48 may be installed on the support unit 12 and/or the receiving unit 21 as required in each case.

The process system 15 may further comprise a first cross over pipe 22 that is fluidly connected to the first pipe element 58 with a first cross pipe connection 23 and to the second pipe element 68 with a second cross pipe connection 24. A fluid can thereby be flown through the first cross over pipe 22 from the first pipe element 58 to the second pipe element 68 or in the opposite direction. In the first cross over pipe 22 there is preferably provided a first valve device 30 so that the flow of fluid through the first cross over pipe 22 can be controlled.

The process system 15 may further also comprise a second cross over pipe 26 that is fluidly connected to the first pipe element 58 with a third cross pipe connection 27 and to the second pipe element 68 with a fourth cross pipe connection 28. A fluid can thereby be flown through the second cross over pipe 26 from the first pipe element 58 to the second pipe element 68 or in the opposite direction. In the second cross over pipe 26 there is preferably provided a second valve device 31 so that the flow of fluid through the second cross over pipe 26 can be controlled.

The first valve device 30 and the second valve device 31 are preferably standard valve devices that are commercially available and is not further described herein. The first, second, third and fourth cross pipe connections 23, 24, 27,

28 may be formed with standard T-junction pipe elements which will allow fluid to flow through the first pipe element 58 and/or the second pipe element 68 and/or the first cross over pipe 22 and/or the second cross over pipe 26 depending on how the first valve device 30, the second valve device 31 and other valve devices that the process system 15 may be provided with, are set.

The process system 15 is preferably further provided with various valve devices for emergency situations and/or regulation of fluid flow through the process system 15.

The first pipe element 58 is preferably provided with a first cargo valve device 39 for regulation of fluid flow through the first pipe element 58. The first cargo valve 39 is preferably arranged in the first pipe element 58 between the first cross pipe connection 23 and the third cross pipe connection 27.

Further, the second pipe element 68 is preferably provided with a second cargo valve device 40 for regulation of fluid flow through the second pipe element 68. The second cargo valve 40 is preferably arranged in the second pipe element 68 between the second cross pipe connection 24 and the fourth cross pipe connection 28.

The first pipe element 58 may further be disconnectably connected to a first aerial hose 16. Similarly, the second pipe element 68 may be disconnectably connected to a second aerial hose 17.

With this arrangement of the first and second cargo valve devices 39, 40 and the first and second cross over pipes 22, 26 that each fluidly connects the first pipe element 58 and the second pipe element 68, recirculation of fluid and/or pre-cooling of the first and second transfer pipes 13, 14 is enabled without the presence of the floating or non-floating facility 11. Furthermore, tedious pre-cooling activities with the LNGC present is avoided and it is ensured that the first and second transfer pipes 13, 14 and/or the first and second pipe elements 58, 68 are not shock cooled by quick transfer ramp-up when the fluid that is transferred through the fluid transfer system 10 is a cryogenic fluid like for example LNG.

As can easily be seen in FIG. 8, by closing the first cargo valve device 39 and the second cargo valve device 40 and opening the first valve device 30 in the first cross over pipe 22, fluid may be flowed from the receiving structure 21 through the second transfer pipe 14 as indicated with the arrow C, further through the first cross over pipe 22 and back to the receiving structure 21 through the first transfer pipe 13 as indicated with the arrow B. By gradually using cooler fluid, the first and second transfer pipes 13, 14 can be gradually cooled until they reach a temperature that is not going to cause any shock cooling of the first and/or second transfer pipes 13, 14 that could happen if a cryogenic fluid is transferred through the first and second transfer pipes 13, 14 without precooling of the first and second transfer pipes. The flow direction may obviously also run in the opposite direction.

Similarly, by closing the first and second cargo valves 39, 40 and opening the second valve device 31 in the second cross over pipe 26, fluid may be flowed from the floating or non-floating facility 11 through the first aerial hose 16 as indicated with the arrow A, further through the second cross over pipe 26 and back to the floating or non-floating facility 11 through the second aerial hose 17 as indicated with the arrow D. By gradually using cooler fluid, the first and second aerial hoses 16, 17 can be gradually cooled until they reach a temperature that is not going to cause shock cooling of the first and/or second aerial hoses 16, 17 that could happen if a cryogenic fluid is transferred through the first and second aerial hoses 16, 17 without precooling of the first and second aerial hoses. The flow direction may obviously also run in the opposite direction.

Of course, when the aerial hoses 16, 17 are connected to a floating or non-floating facility 11, for example an LNG-carrier, for transfer of a cryogenic fluid like LNG, the fluid transfer system 10 that will transfer a cryogenic fluid from the floating or non-floating facility 11 to the receiving structure 21 via the support unit 12, may be precooled. Fluid can be flowed through the first aerial hose 16, further through the first pipe element 58 on the support unit 12, further through the first transfer pipe 13 to the receiving structure 21 and then back to the floating or non-floating structure 11 through the second transfer pipe 14, further through the second pipe element 68 on the support unit 12, further through the second aerial hose 17 and back to the floating or non-floating structure. This path is indicated in FIG. 8 by following arrows A-B-C-D in that order.

If the receiving structure 21 is storing a cryogenic fluid that is transferred to the floating or non-floating structure 11 via the support unit 12, the fluid transfer system 10 may be precooled in a similar manner. Fluid can for example be flowed through the second transfer pipe 14, further through the second pipe element 68 on the support unit 12, and further through the second aerial hose 17 to the floating or non-floating structure 11, and then back to the receiving structure 21 through the first aerial hose 16, further through the first pipe element 58 on the support unit 12, and further through the first transfer pipe 13 to the receiving structure 21. This path is indicated in FIG. 8 by following arrows C-D-A-B in that order. The flow direction may obviously also run in the opposite direction.

Finally, it should be noted that the fluid transfer system 10 may be precooled by flowing a fluid through the two paths, i.e. the first path through the first transfer pipe 13—the first pipe element 58—the first aerial hose 16 and the second path through the second transfer pipe 14—the second pipe element 68—the second aerial hose 17, in the same direction. Hence, the fluid transfer system 10 may be precooled by flowing a gradually cooler fluid through the two paths in the same direction, either from the receiving structure 21 to the floating or non-floating structure 11 or in the opposite direction from the floating or non-floating structure 11 to the receiving structure 21.

During a transfer operation, as can easily be seen in FIG. 8, by opening all valve devices 33, 34, 36, 37, 39, 40 in the first and second pipe elements 58, 68 and closing the first valve device 30 in the first cross over pipe 22 and closing the second valve device 31 in the second cross over pipe 26, fluid may be flowed from the receiving structure 21 to the floating or non-floating structure 11 through the second transfer pipe 14, further through the second pipe element 68 on the support unit 12, and further through the second aerial hose 17 to the floating or non-floating structure 11. Simultaneously, fluid may be flowed from the floating or non-floating structure 11 through the first aerial hose 16, further through the first pipe element 58 on the support unit 12, and further through the first transfer pipe 13 to the receiving structure 21. The flow direction may obviously also run in the opposite direction, but also through the two paths in the same direction.

The first pipe element 58 may further be disconnectably connected to a first aerial hose 16, preferably with a first breakaway coupling 36. In case of any emergency situation, the first aerial hose 16 may therefore be quickly disconnected from the first pipe element 58. Similarly, the second pipe element 68 may be disconnectably connected to a second aerial hose 17, preferably with a second break away coupling 37. In case of any emergency situation, the second aerial hose 17 may therefore be quickly disconnected from the second pipe element 68. That the first aerial hose 16 and the second aerial hose 17 can be quickly disconnected from the first and second pipe element 58, 68 respectively is important in case a hazardous substance, like for example LNG, is transported through the first and second aerial hoses 16, 17 and an emergency situation may arise.

The first breakaway coupling 36 is used to separate the first pipe element 58 and the first aerial hose 16, but preferably also to stop the flow of fluid through the first pipe element 58 and the first aerial hose 16. Similarly, the second breakaway coupling 37 is used to separate the second pipe element 68 and the second aerial hose 17, but preferably also to stop the flow of fluid through the second pipe element 68 and the second aerial hose 17. The breakaway couplings 36, 37 are preferably a standard type of breakaway couplings that are commercially available and their design will not be any further described herein.

The process system 15 shown in FIG. 8 is preferably further provided with a first emergency shut down valve device (ESD) 33 arranged in the first pipe element 58. The first emergency shut down valve device 33 is, like the first cargo valve 39, preferably arranged in the first pipe element 58 between the first cross pipe connection 23 and the third cross pipe connection 27. It should be noted that the order in which the first cargo valve 39 and the first emergency shut down valve device 33 is arranged in the first pipe element 58, i.e. their mutual position relative to the first cross pipe connection 23 and the third cross pipe connection 27, is unimportant.

The process system 15 shown in FIG. 8 is preferably also provided with a second emergency shut down valve device (ESD) 34 arranged in the second pipe element 68. The second emergency shut down valve device 34 is, like the second cargo valve 39, preferably arranged in the second pipe element 68 between the second cross pipe connection 24 and the fourth cross pipe connection 28. It should be noted that the order in which the second cargo valve 40 and the second emergency shut down valve device 34 is arranged in the second pipe element 68, i.e. their mutual position relative to the second cross pipe connection 24 and the fourth cross pipe connection 28, is unimportant.

The first and second emergency shut down valve devices 33, 34 are used to stop the flow of fluid through the first pipe element 58 and the second pipe element 68 respectively in case there is an emergency situation, for example a leakage of fluid from the process system 15. The emergency shut down valve devices 33, 34 are preferably a standard type of emergency shut down valve devices that are commercially available and their design will not be any further described herein.

The process system preferably comprises a vent system 50 that is capable of venting or removing a fluid such as LNG from one, some or all of the first pipe element 58, the second pipe element 68, the first cross over pipe 22, the second cross over pipe and any other pipe element of the process system 15 in which a hazardous fluid could be trapped. The first aerial hose 16 and the second aerial hose 17 are preferably vented from the floating or non-floating structure 11. Similarly, the first transfer pipe 13 and the second transfer pipe 14 are preferably vented from the receiving structure 21. Alternatively, any trapped fluid in the transfer pipes 13, 14 and aerial hoses 16, 17 may be vented by the vent system 50 by connecting addition vent pipes (not shown in figure) to the vent mast 49.

The vent system 50 comprises a vent mast 49 and a number of pipes that are connected to the vent mast 49 such that any potentially trapped fluid, such as LNG, may be vented from the pipe elements 58, 68, 22, 23 on the support unit 12 which are not fluidly connected to the receiving structure 21 or the floating or non-floating structure 11. As shown in FIG. 8, a first vent pipe 102 is fluidly connected to the vent mast 49 and the first pipe element 58 in a first vent pipe connection 108, and a second vent pipe 103 is also fluidly connected to the vent mast 49 and to the first pipe element 58 in a second vent pipe connection 109. Further a third vent pipe 104 is fluidly connected to the vent mast 49 and the second pipe element 68 in a third vent pipe connection 110, and a fourth vent pipe 105 is fluidly connected to the vent mast 49 and the second pipe element 68 in a fourth vent pipe connection 111. It should be noted that the vent pipe connections 108, 109, 110, 111 may be arranged in various different configurations in the process system 15 depending on the layout and presence of emergency shut down valve devices 33, 34 and/or the breakaway couplings 36, 37 and/or the properties of the fluid that is transferred, for example whether the fluid is pressurized or non-pressurized and/or explosive or non-explosive and/or hazardous or non-hazardous. Hence other configurations will work and enable venting of potentially trapped fluid and one example is shown in FIG. 8.

In the first vent pipe 102 there is provided a first pressure relief valve 42, in the second vent pipe 103 there is provided a second pressure relief valve 43, in the third vent pipe 102 there is provided a third pressure relief valve 44 and in the fourth vent pipe 105 there is provided a fourth pressure relief valve 45. If the pressure in the process system 15 increases to a an unacceptably high level, one, some or all of the first, second, third and fourth pressure relief valves 42, 43, 44, 45 will open and let gas flow out through the first, second, third and fourth vent pipes 102, 103, 104, 105 respectively.

The first vent pipe connection 108 may for example, as shown in FIG. 8, be arranged in the first pipe element 58 between the first emergency shut down valve 33 and the first cargo valve device 39. Similarly, the third vent pipe connection 110 may for example, as shown in FIG. 8, be arranged in the second pipe element 68 between the second emergency shut down valve 34 and the second cargo valve device 40.

The second vent pipe connection 109 may for example, as shown in FIG. 8, be arranged in the first pipe element 58 between the first break away coupling 36 and the first cargo valve device 39. Similarly, the forth vent pipe connection 111 may for example, as shown in FIG. 8, be arranged in the second pipe element 68 between the second break away coupling 37 and the second cargo valve device 40.

As mentioned above, the process system 15 preferably comprises a vent system 50 so that a fluid may be vented from the process system 15 if that is needed. That can be desirable if the fluid transfer system 10 is used to transfer a fluid under pressure and/or a fluid that expands when vaporizing and/or a hazardous fluid such as LNG. Generally, the vent mast 49 is preferably connected to the first pipe element 58 and the second pipe element 68 and any further pipe element of the process system 15 such that any fluid that is trapped in the process system 15 when the cargo valve devices 39, 40 and/or the emergency shut down valve devices 33, 34 and/or the breakaway couplings 36, 37 are closed, can be vented through the vent mast 49 or vented through the receiving structure or floating or non-floating structure.

Although the forces of the transfer pipe 13, 14 are taken by the chute devices 59, 69 and the tie-in supports 75, it is preferable that such loads are not transmitted to the fixed flange connection 73, 74 and the pipe element 58, 68 due to misalignment of the pipe element 58, 68 and the spool piece 61, 71, thermal expansion or contraction, difference in strain between the tie-in device 77, 79 and the pipe element 58, 68 or by other means. Therefore, the pipe element 58, 68 may be adapted to be able to move to a limited extent in the longitudinal/axial direction as indicated by arrows $X_1$ and $X_2$ in FIG. 6, and/or in the transverse direction as indicated by arrows $Y_1$ and $Y_2$ in FIG. 6.

Although the forces of the transfer pipes 13, 14 are taken by the first and second chute devices 59, 69 respectively and the respective tie-in supports 75, it is preferable that such loads are not transmitted to the first and second flange connection 73, 74 and the first and second pipe element 58, 68 due to misalignment of the first pipe element 58 and the first spool piece 61 and/or the second pipe element 68 and the second spool piece 71, or due to thermal expansion or contraction, or due to difference in strain between the tie-in device 77, 79 and the pipe element 58, 68 caused by having no limit stops or if the limit stops are bottomed-out, or by other means. Therefore, the first and second pipe element 58, 68 may be adapted to be able to move horizontally to a limited extent in the longitudinal/axial direction, as indicated by the arrows $X_1$ and $X_2$ in FIG. 6, and/or in the transverse direction as indicated by arrows $Y_1$ and $Y_2$ in FIG. 6.

The first and second pipe elements 58, 68 are preferably supported on at least one support device, but preferably a plurality of process system support devices 90 that comprises a lower support element 93 and an upper support element 92 as shown in FIG. 6. The lower support element 93 is preferably securely attached to the support unit 12, for example by welding, bolts or any other suitable fastening means. The upper support element 92 is preferably attached to the pipe element 58, 68, for example with bolts, one or more clamps, by welding or any other suitable fastening means. The upper support element 92 rests on the lower support element 93. Preferably the upper support element 92 is provided with a substantially plane upper support surface 53 and the lower support element 93 is provided with a corresponding substantially plane lower support surface 54 such that the upper support surface 53 and the lower support surface forms a slide bearing 91. The first and second pipe elements 58, 68 are thereby capable of moving in a substantially horizontal direction in response to forces from the first and second transfer pipes 13, 14 acting on the first and second pipe elements 58, 68. Consequently, the entire process system 15 is capable of moving horizontally relative to the support unit 12 in response to external forces acting on the process system 15, typically from the first and second transfer pipes 13, 14.

In order to limit the extent of the movement of the first and second pipe elements 58, 68 in a substantially horizontal direction, at least one limit stop 98, 99, 100 may be provided that will limit the movement of the first and second pipe elements 58, 68 in a longitudinal direction of the first and second pipe elements, i.e. the axial direction of the first and second pipe elements 58, 68 at the point where the first and second pipe elements 58, 68 are connected to the first spool piece 61 and the second spool piece 71 respectively, and/or a transverse direction, i.e. a direction that is substantially perpendicular to the longitudinal direction of the first and second pipe elements 58, 68.

As indicated in FIG. 6, the longitudinal movements of the first and second pipe elements 58, 68, as indicated by arrows $X_1$ and $X_2$ in FIG. 6, may be limited by providing the upper support element 92 of at least one of the process system support devices 90 with a first longitudinal limit stop 98 and/or a second longitudinal limit stop 99. It should, however, be noted that the first longitudinal limit stop and/or the second longitudinal limit stop need not be provided on any of the process system support devices 90 but may be provided separately on the support unit 12.

The first longitudinal limit stop 98 may comprise a substantially vertical, structural element that is securely attached to the upper support element 92 projecting downwards from the upper support element 92 such that first longitudinal limit stop 98 will abut the lower support element 93 when the first and second transfer pipes 13, 14 pushes the first and second pipe elements 58, 68 respectively in the direction of arrow $X_1$ in FIG. 6. When the first longitudinal limit stop 98 abuts the lower support element 93, the first and second pipe element 58, 68 are prevented from moving any further in the longitudinal direction away from the first and second chute devices 59, 69, i.e. in the direction of arrow $X_1$ in FIG. 6.

In a similar way, the second longitudinal limit stop 99 may comprise a substantially vertical, structural element that is securely attached to the upper support element 92 projecting downwards from the upper support element 92 such that the second longitudinal limit stop 99 will abut the lower support element 93 when the first and second pipe elements 58, 68 are pushed in the direction of arrow $X_2$ in FIG. 6. When the second longitudinal limit stop 99 abuts the lower support element 93, the first and second pipe elements 58, 68 are prevented from moving any further in the direction of arrow $X_2$ in FIG. 6.

As further indicated in FIG. 6, the transverse movements of the first and second pipe elements 58, 68, as indicated by arrows $Y_1$ and $Y_2$ in FIG. 6, may be limited by providing the lower support element 93 of at least one of the process system support devices 90 with a first transverse limit stop 100 and/or a second transverse limit stop (not visible in FIG. 6). It should be noted that the first transverse limit stop and/or the second transverse limit stop need not be provided on any of the process system support devices 90 but may be provided separately on the support unit 12.

The first transverse limit stop 100 comprises a substantially vertical, structural element that is securely attached to the lower support element 93 projecting upwards from the lower support element 93 such that the first transverse limit stop 100 will abut the upper support element 92 when the first and second pipe elements 58, 68 are pushed in the direction of arrow $Y_1$ in FIG. 6. When the first transverse limit stop 100 abuts the upper support element 92, the first and second pipe elements 58, 68 are prevented from moving any further in the transverse direction in the direction of arrow $Y_1$ in FIG. 6.

In a similar way, the second transverse limit stop on the opposite side of the pipe element 58, 68 as compared to the first transverse limit stop (not visible in FIG. 6 as mentioned above), comprises a substantially vertical, structural element that is securely attached to the lower support element 93 projecting upwards from the lower support element 93 such that second transverse limit stop will abut the upper support element 92 when the first and second pipe elements 58, 68 are pushed in the direction of arrow $Y_2$ in FIG. 6. When the second transverse limit stop abuts the upper support element 92, the first and second pipe elements 58, 68 are prevented from moving any further in the transverse direction in the direction of arrow $Y_2$ in FIG. 6.

The distance that the first and second pipe elements 58, 68 are allowed to move in the longitudinal direction, and hence the distance that the process system 15 is allowed to move in the longitudinal direction $X_1$-$X_2$, is indicated by the Greek letter Δ in FIG. 6. The distance A may vary from one installation to another depending on various factors like how much thermal expansion and contraction that must be allowed for and how much room there is on the support unit 12 for movement of the pipe element 58, 68 and the process system 15 in the longitudinal direction $X_1$-$X_2$. Although not indicated in FIG. 6, the same may apply to the movement of the first and second pipe elements 58, 68 in the transverse direction $Y_1$-$Y_2$.

It should be noted that the design of the embodiment of the longitudinal/axial and transverse limit stops 98, 99, 100 described above and shown in FIG. 6 are examples of a design that will work with the present process system 15. However, there are many other designs that could be employed to limit the movement of the process system 15 on the support elements 92 and it should be understood that the limiting of the movement of the process system 15 is not limited to using the design shown in FIG. 6.

In FIGS. 9 and 10 there are shown two other possible configurations of the fluid transfer system 10.

In FIG. 9 a configuration of the present invention is illustrated where the support unit 12 comprises a number of piles 56 that are mounted in the seabed 55 as clearly shown in the figure. At least one transfer pipe 13, 14, preferably a floating transfer pipe, is connected to at least one pipe element 58, 68 in the same way as described in connection with FIGS. 1-8 above. The at least one transfer pipe 13, 14 is further tied in to the support unit 12 with at least one tie-in system 47, 48 as described in connection with FIGS. 1-8 above. The at least one pipe element 58, 68 is lead into the water 19 and further to a facility (not shown in the figure) for receiving or supplying a fluid through the at least one pipe element 58, 68.

In FIG. 10 a configuration of the present invention is illustrated where the support unit 12 is a simplified structure that comprises a support that is arranged in the transition zone between land and sea 19. As shown, the support unit 12 can be a simple concrete structure that is built directly on the shore 20 and seabed 55. At least one transfer pipe 13, 14, preferably a floating transfer pipe, is connected to at least one pipe element 58, 68 in the same way as described in connection with FIGS. 1-8 above. The at least one transfer pipe 13, 14 is further tied in to the support unit 12 with at least one tie-in system 47, 48 as described in connection with FIGS. 1-8 above. The at least one pipe element 58, 68 is lead onshore from the support unit 12 and further to a facility (not shown in the figure) for receiving or sending off a fluid through the at least one pipe element 58, 68.

Although through most of the description of the figures, the transfer pipe or pipes 13, 14 have been described as transporting a fluid, it should be kept in mind that a bulk material, such as a substance in powder form, can be transported through the transfer pipe or pipes 13, 14 and the process system 15 on the support unit 12.

The invention has now been explained with reference to non-limiting examples of the invention. Although the present invention and its advantages have been described in detail, it should be understood that various changes, substitutions and alterations can be made to the embodiments disclosed herein. A person skilled in the art will therefore appreciate that modifications and changes may be made to this embodiment which will be within the scope of the invention as defined in the following claims.

What is claimed is:

1. A tie-in system for tie-in of a transfer pipe to a support unit, where the transfer pipe is arranged at least partly in a body of water, the tie-in system comprising:

a spool piece that in one end is attached to the transfer pipe and in the other end is connected to a pipe element, arranged on the support unit, with a flange connection, a chute device attached to the support unit and accommodating the transfer pipe such that the chute device supports the transfer pipe and takes up and transfers vertical and transverse forces from the transfer pipe to the support unit, a tie-in device that is connected to the spool piece and is connected to a tie-in member on a tie-in support which is securely and directly attached to the support unit such that tension loads are transferred from the transfer pipe to the support unit through the tie-in device.

2. Tie-in system according to claim 1, wherein the chute device comprises a bottom member and two side members fastened to the bottom member such that the transfer pipe can be accommodated between the side members and be supported by the bottom member.

3. Tie-in system according to claim 1, wherein the tie-in device comprises a turnbuckle and/or a rigging screw and/or a hydraulic tensioner and/or a fixed rod of a predetermined length.

4. Tie-in system according to claim 1, wherein the spool piece comprises a spool piece flange for attachment to a flange element on a pipe element.

5. Tie-in system according to claim 1, wherein the spool piece comprises a fastening member to which the tie-in device is attached, the fastening member being securely attached to the spool piece.

6. The tie-in system according to claim 1, wherein the tie-in member is integrally formed as part of the tie-in support.

7. The tie-in system according to claim 1, wherein the tie-in support is spaced apart from the transfer pipe element.

8. Tie-in system according to claim 1, wherein the chute device is provided with an inboard section that is attached to the support unit and an outboard section that faces the body of water and is curved downwards when the chute device is attached to the support unit.

9. Tie-in system according to claim 8, wherein the bottom member of the outboard section and the side members are arranged with gradually increasing width towards an outer end portion of the chute device that faces the body of water.

10. A fluid transfer system for transfer of a fluid between a floating or non-floating facility and a receiving structure via a support unit, the fluid transfer system comprising a support unit, at least one transfer pipe and a process system comprising at least one pipe element that is arranged on the support unit, wherein the at least one transfer pipe is connected to the at least one pipe element and is tied in to the support unit with a tie-in system according to claim 1.

11. Fluid transfer system according to claim 10, wherein the chute device is attached to a chute support that is securely attached to the support unit.

12. Fluid transfer system according to claim 10, wherein the tie-in member is securely attached to the tie-in support.

13. Fluid transfer system according to claim 10, wherein the tie-in system comprises a first tie-in device and a second tie-in device that are arranged on opposite sides of the spool piece and the at least one pipe element.

14. Fluid transfer system according to claim 10, wherein the at least one pipe element of the process system is movably supported on the support unit.

15. Fluid transfer system according to claim 10, wherein the fluid transfer system comprises at least one process system support device that are securely mounted to the support unit and/or the process system, the at least one process system support device allowing the process system to move relative to the support unit in response to external forces acting on the process system.

16. Fluid transfer system according to claim 15, wherein the process system support device comprises a slide bearing.

17. Fluid transfer system according to claim 15, wherein the fluid transfer system comprises at least one limit stop that limits the movements of the at least one pipe element of the process system relative to the support unit in at least one direction.

18. Fluid transfer system according to claim 10, wherein the fluid transfer system comprises a first transfer pipe that is tied in to the support unit with a first tie-in system and a second transfer pipe that is tied in to the support unit with a second tie-in system.

19. Fluid transfer system according to claim 18, wherein a first pipe element of the process system is connected to the first transfer pipe and a second pipe element of the process system is connected to the second transfer pipe.

20. Fluid transfer system according to claim 19, wherein process system further comprises:
a first cross over pipe that is fluidly connected to the first pipe element and the second pipe element,
a second cross over pipe that is fluidly connected to the first pipe element and the second pipe element,
a first valve device arranged in the first cross over pipe,
a second valve device arranged in the second cross over pipe.
a first cargo valve that is provided in the first pipe element, and
a second cargo valve that is provided in the second pipe element.

21. Fluid transfer system according to claim 19, wherein the process system comprises a first aerial hose that is fluidly connected to the first pipe element and adapted to be fluidly connected to the floating facility, and a second aerial hose that is fluidly connected to the second pipe element and adapted to be fluidly connected to the floating facility.

22. A tie-in system for tie-in of a transfer pipe to a support unit, where the transfer pipe is arraned at least partly in a body of water, the tie-in system comprising:
a transfer pipe, at least partly in a body of water,
a spool piece that in one end is attached to the transfer pipe and in the other end is connected to a pipe element, arranged on the support unit, with a flange connection,
a chute device attached to the support unit and accommodating the transfer pipe such that the chute device supports the transfer pipe and takes up and transfers vertical and transverse forces from the transfer pipe to the support unit,
a tie-in device that is connected to the spool piece and is connected to a tie-in member on a tie-in support which is securely and directly attached to the support unit such that tension loads are transferred from the transfer pipe to the support unit through the tie-in device.

23. Tie-in system according to claim 22, wherein the tie-in device comprises a turnbuckle and/or a rigging screw and/or a hydraulic tensioner and/or a fixed rod of a predetermined length.

24. Tie-in system according to claim 22, wherein the spool piece comprises a spool piece flange for attachment to a flange element on a pipe element.

25. Tie-in system according to claim 22, wherein the spool piece comprises a fastening member to which the tie-in device is attached, the fastening member being securely attached to the spool piece.

26. The tie-in system according to claim 22, wherein the tie-in member is interally formed as part of the tie-in support.

27. The tie-in system according to claim 22, wherein the tie-in support is spaced apart from the transfer pipe element.

28. Tie-in system according to claim 22, wherein the chute device comprises a bottom member and two side members fastened to the bottom member such that the transfer pipe can be accommodated between the side members and be supported by the bottom member.

29. Tie-in system according to claim 22, wherein the chute device is provided with an inboard section that is attached to the support unit and an outboard section that faces the body of water and is curved downwards when the chute device is attached to the support unit.

30. Tie-in system according to claim 29, wherein the bottom member of the outboard section and the side members are arranged with gradually increasing width towards an outer end portion of the chute device that faces the body of water.

* * * * *